United States Patent
Brkovic

(10) Patent No.: US 6,804,125 B2
(45) Date of Patent: Oct. 12, 2004

(54) ISOLATED DRIVE CIRCUITRY USED IN SWITCH-MODE POWER CONVERTERS

(75) Inventor: Milivoje S. Brkovic, Carlsbad, CA (US)

(73) Assignee: di/dt Inc., Carlsbad, CA (US)

( * ) Notice: Subject to any disclaimer, the term of this patent is extended or adjusted under 35 U.S.C. 154(b) by 134 days.

(21) Appl. No.: 10/061,189

(22) Filed: Feb. 1, 2002

(65) Prior Publication Data

US 2002/0101741 A1 Aug. 1, 2002

Related U.S. Application Data

(60) Provisional application No. 60/265,174, filed on Jan. 26, 2001.

(51) Int. Cl.[7] .............................................. H02M 3/335
(52) U.S. Cl. ........................ 363/17; 363/127; 363/132
(58) Field of Search .............................. 363/17, 18, 19, 363/22, 23, 125, 127, 131, 132

(56) References Cited

U.S. PATENT DOCUMENTS

| | | | |
|---|---|---|---|
| 4,591,964 A | 5/1986 | Kemstedt | 363/24 |
| 4,884,186 A | 11/1989 | Small | 363/132 |
| 5,198,969 A | 3/1993 | Redl et al. | 363/17 |
| 5,274,543 A | 12/1993 | Loftus, Jr. | 363/127 |
| 5,353,212 A | 10/1994 | Loftus, Jr. | 363/17 |
| 5,590,032 A | 12/1996 | Bowman et al. | 363/15 |
| 5,726,869 A | 3/1998 | Yamashita et al. | 363/21 |
| 5,870,299 A | 2/1999 | Rozman | 363/127 |
| 5,880,939 A | 3/1999 | Sardat | 363/17 |
| 5,907,481 A | 5/1999 | Svardsjo | 363/25 |
| 5,999,432 A | * 12/1999 | Nilssen | 363/132 |
| 6,038,148 A | 3/2000 | Farrington et al. | 363/21 |
| 6,069,802 A | 5/2000 | Priegnitz | 363/21 |
| 6,111,769 A | 8/2000 | Zhang et al. | 363/127 |
| 6,169,683 B1 | * 1/2001 | Farrington | 363/127 |
| 6,185,114 B1 | 2/2001 | Matsumoto et al. | 363/21 |
| RE37,510 E | 1/2002 | Bowman et al. | 363/15 |
| 6,504,739 B2 | * 1/2003 | Phadke | 363/127 |

FOREIGN PATENT DOCUMENTS

| | | |
|---|---|---|
| DE | 4035969 A1 | 8/1991 |
| DE | 4327073 C1 | 10/1994 |
| EP | 0957568 A2 | 11/1999 |
| JP | 58136137 | 8/1983 |
| JP | 03128673 | 5/1991 |
| JP | 10215584 | 8/1998 |
| WO | WO 93/19516 | 9/1993 |

* cited by examiner

Primary Examiner—Jessica Han
(74) Attorney, Agent, or Firm—Lowenstein Sandler PC

(57) ABSTRACT

A drive transformer and associated circuitry for providing power and appropriate delays to primary switches and synchronous rectifiers in switch-mode power converters in a full-bridge topology. The invention takes advantage of the leakage inductances of the drive transformer windings as well as the input capacitance of the primary switches (MOSFETs) to provide the delays. No separate circuitry is needed to provide such delays, thereby providing reliability. Exemplary embodiments further disclose means to disable or enable the primary winding from a condition sensed on the secondary side even with a control and feedback circuit located on the secondary side. The invention further discloses means to use one drive transformer winding to control two switches completely out of phase.

32 Claims, 14 Drawing Sheets

US 6,804,125 B2

ISOLATED DRIVE CIRCUITRY USED IN SWITCH-MODE POWER CONVERTERS

CROSS REFERENCE TO RELATED APPLICATION

This is a non-provisional application based on provisional application Serial No. 60/265,174, filed Jan. 26, 2001.

BACKGROUND

1. Field of the Invention

This invention relates generally to switch-mode power converters and more particularly it provides simple a drive circuit and an enable function with isolation and having high performance in full-bridge topologies using synchronous rectification.

2. Background Discussion

A switch-mode power converter is a circuit that uses an inductor, a transformer, or a capacitor, or some combination, as energy storage elements to transfer energy from an input source to an output load in discrete pulses. Additional circuitry is added to maintain a constant voltage within the load limits of the circuit. The basic circuit can be configured to step up (boost), step down (buck), or invert output voltage with respect to input voltage. Using a transformer allows the output voltage to be electrically isolated from the input voltage.

Switch-mode converters have changed very little over the past 15 years, most using Schottky diodes to rectify their output. However, newer challenges in the industry for dc/dc power supply designers demand lower voltages required by digital circuits, and also higher frequencies. Since converters using Schottky diodes for rectification experience a large forward voltage drop relative to the output voltage, their efficiency is generally relatively low. Lower efficiencies result in more dissipated heat that has to be removed using a heat sink, which takes up space. A dramatic increase in converter efficiency can be accomplished by replacing the Schottky diodes with "synchronous rectifiers" realized in practice with MOSFET transistors. Synchronous rectifiers are not new, but they have previously been too expensive to justify, primarily due to high "on" resistance. However, as costs fall and performance improves, synchronous rectifiers have quickly become a viable component, especially for low voltage converters.

Using self-driven synchronous rectifiers in various converter topologies is very attractive and popular because there is no need for additional isolation between drive signals. It has the advantage of simplicity. However, it has the disadvantage of cross conduction between synchronous rectifiers and primary side switches, as well as reverse recovery current of the parasitic anti-parallel diode of the MOSFETs used for synchronous rectification. In order to minimize these shoot-through currents, an inductance (or saturable inductor) is usually placed in series with the synchronous rectifier. While this may be a solution for lower switching frequencies, for example, 100 kHz-200 kHz, it is not suitable for higher switching frequencies (200 kHz and above). Especially at switching frequencies of 300–400 kHz this is not an optimum solution. The reason for this is that increased inductance in series with a synchronous rectifier reduces the effective duty cycle on the secondary side of the power transformer due to slower di/dt of the secondary current. As a result, more voltage headroom is required in the power transformer, implying a smaller effective turns ratio and lower efficiency.

A second reason why self-driven synchronous rectification is not suitable for higher switching frequencies is the potential loss due to reverse recovery current in the body diode of the synchronous rectifiers (MOSFETs) and increased turn-on current in the primary side switches (usually MOSFETs).

A third reason why self driven synchronous rectifiers have not been a preferred solution is that the drive voltage, being derived from a power transformer, depends on input voltage and therefore could vary significantly (200% to 300%). As a consequence, power consumption of the drive circuit, which varies exponentially with input voltage, can vary even more (400% to 900%) and decrease overall converter efficiency.

A much more preferred solution is to use direct drive to power synchronous rectifiers with well-controlled timing between drive signals for the main switches (primary side) and synchronous rectifiers (secondary side). This solution thus allows for very efficient operation of the synchronous rectifiers even at high switching frequencies. Yet another benefit of direct driven synchronous rectifiers is that the drive voltage (gate to source) is constant and independent of input voltage, which further improves efficiency over a wide input voltage range.

It is necessary to provide delays between drive signals for primary side switches and secondary side switches in order to avoid cross conduction (simultaneous conduction which would result in a short circuit). When power converters are operated at lower switching frequencies (for example, 100 kHz), cross conduction of the switches can be acceptable since the percentage of the time during which cross conduction occurs relative to the switching period is small (typically 40 ns/10 $\mu$s). Also, a transformer designed to operate at lower frequencies will have a larger leakage inductance, which will reduce cross conduction currents. In the case of higher switching frequencies (above 100 kHz), cross-conduction becomes more unacceptable (40 ns/2 $\mu$s for a 500 kHz switching frequency). Also for higher switching frequencies, the leakage inductance in the transformer as well as in the whole power stage should be minimized for higher efficiency. Consequently, currents due to cross conduction time can become significant and degrade overall converter efficiency and increase heating of the power components significantly.

SUMMARY OF THE INVENTION

In an embodiment of the invention, one drive transformer is used for providing appropriate delays as well as providing power for driving primary switches, particularly high side switches in a full-bridge topology. The leakage inductance of the drive transformer is used to delay turn-on of the main switches (primary side) while turnoff is with no significant delay. The number of windings on the drive transformer is minimized to four, when the control circuit is referenced to the output of the converter, and minimized to five when the control circuit is referenced to the input of the converter. In the full-bridge converter, having the control circuit referenced to the output of the converter, four windings are for: (1) the control and drive circuit pulse width modulated (PWM) type, for example) signal referenced to the output and providing proper waveforms for driving synchronous rectifiers; (2) driving two bottom primary side switches; (3) driving one top primary side switch; and (4) driving second top primary side switch. If the control circuit is referenced to the input of the converter, there are five windings for: (1) the control and drive circuit signal referenced to the input of the converter; (2) providing proper waveforms for driving synchronous rectifiers; (3) driving one top primary side switch; (4) driving a second top primary side switch; and (5) driving two bottom primary side switches. It is an additional object of the invention to provide means to enable/disable the module due to a condition sensed on either the input or the output side via a controller or protection circuit located on either the input or the output side of the converter.

BRIEF DESCRIPTION OF THE DRAWING

The objects, advantages and features of the invention will be more clearly perceived from the following detailed description, when read in conjunction with the accompanying drawing, in which.

DETAILED DESCRIPTION OF THE PREFERRED EMBODIMENTS

Figure 1A:
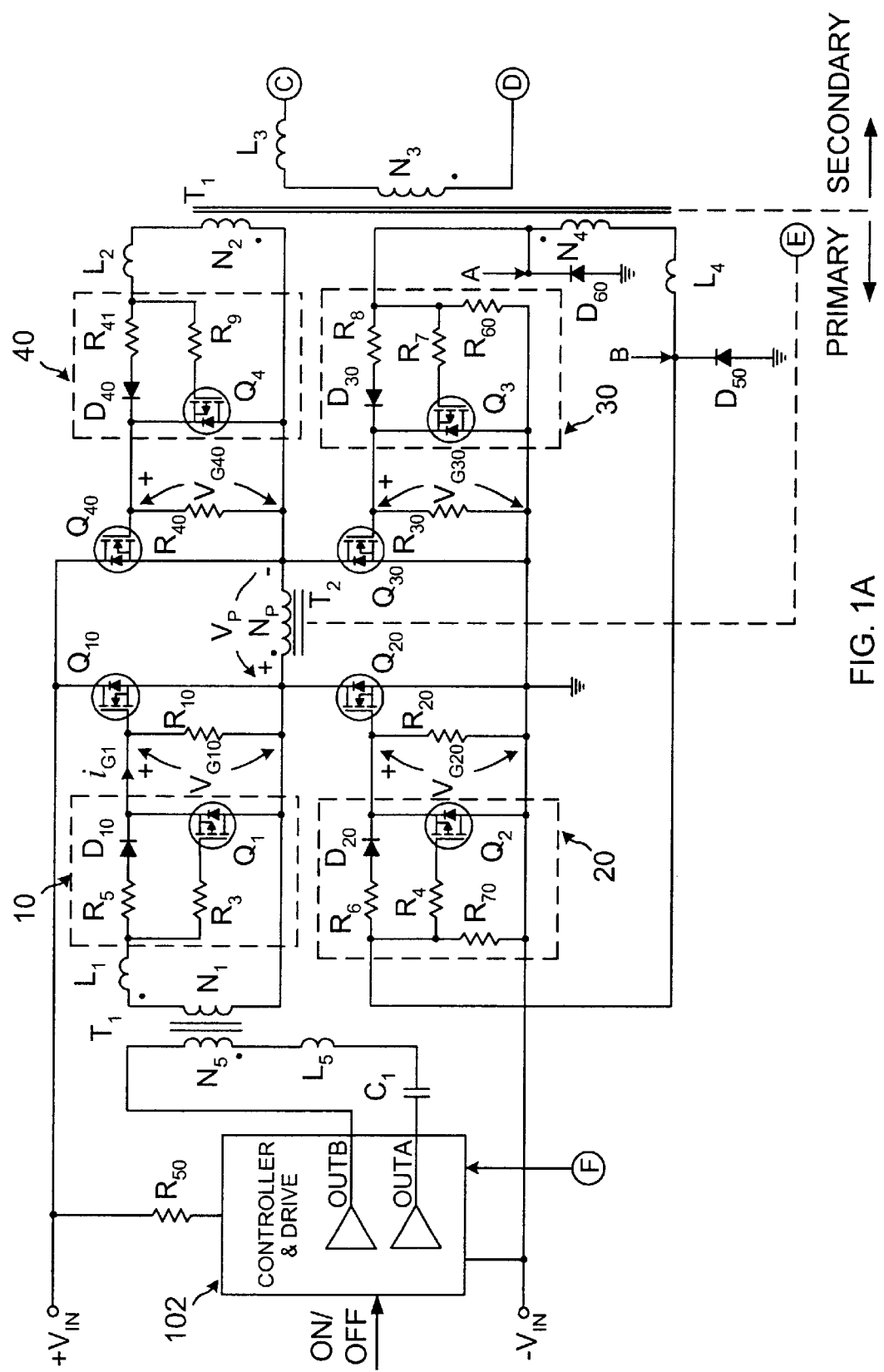
FIGS. 1A and 1B comprise a circuit diagram of an embodiment of the invention using a full-bridge converter with the control and drive circuit referenced to the input side of the converter and a drive transformer that includes five windings.
Figure 1B:
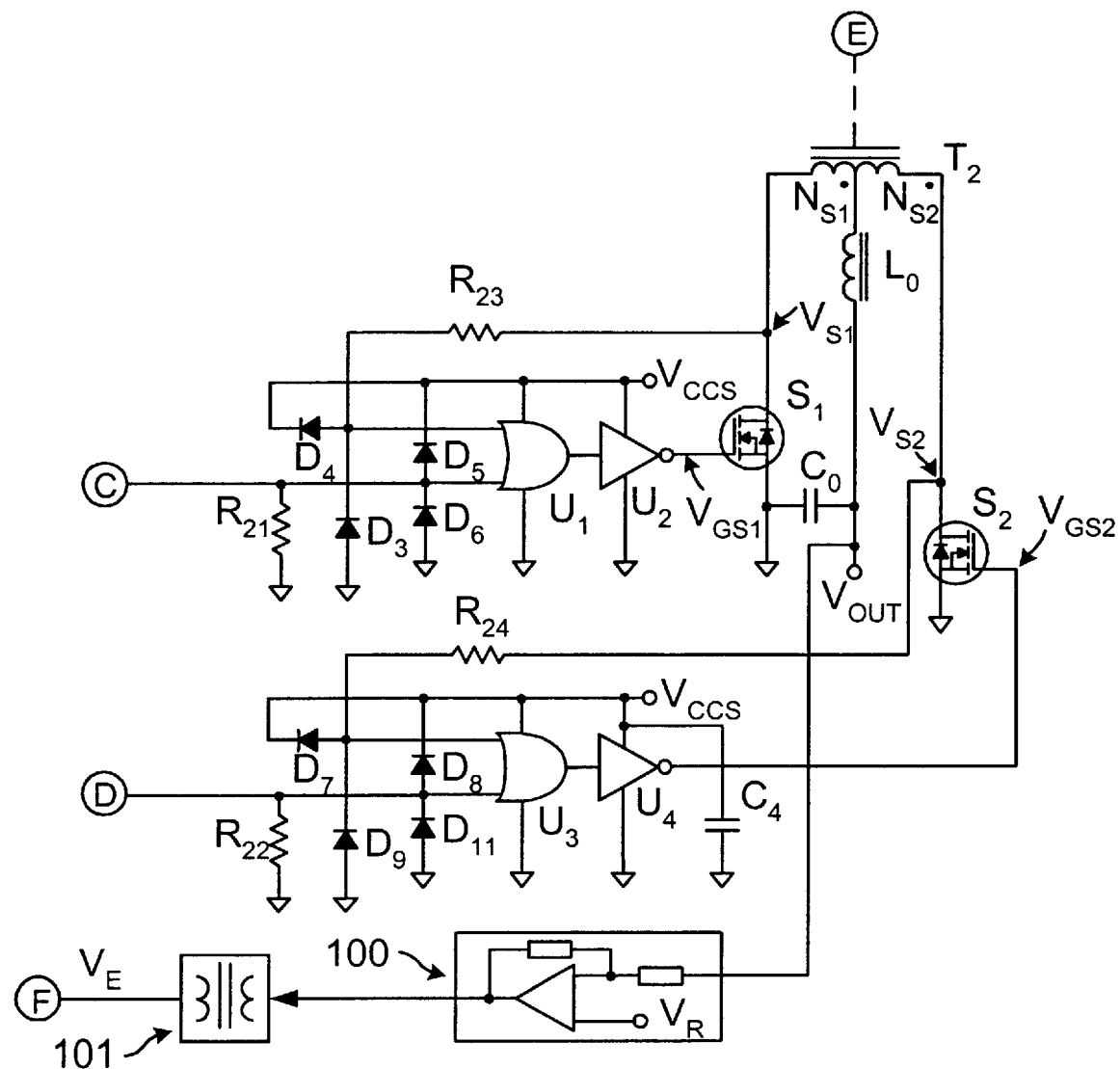

FIGS. 1A and 1B demonstrate a full-bridge topology with synchronous rectifiers using an isolated drive circuit according to an embodiment of the invention. Four primary switches (transistors) $Q_{10}$, $Q_{20}$, $Q_{30}$ and $Q_{40}$, power transformer $T_2$, synchronous rectifiers $S_1$ and $S_2$, output inductor $L_0$, and capacitor $C_0$ form the power stage of the full-bridge converter. Switches $Q_{10}$ and $Q_{20}$ form one leg of the bridge, while switches $Q_{30}$ and $Q_{40}$ form the other leg of the bridge. Both legs of the bridge are connected across the input voltage, with $Q_{10}$ and $Q_{40}$ connected to the positive side and $Q_{20}$ and $Q_{30}$ connected to the negative side. Switches in the same leg ($Q_{10}$ and $Q_{20}$, and $Q_{30}$ and $Q_{40}$) always conduct out of phase, while diagonal switches conduct simultaneously ($Q_{10}$ and $Q_{30}$, and $Q_{20}$ and $Q_{40}$). Primary winding $N_p$ of power transformer $T_2$ is connected between the mid-points of the two legs. Two secondary windings, $N_{S1}$ and $N_{S2}$, are preferably identical and are connected in series. The common point between two windings $N_{S1}$ and $N_{S2}$ is connected to one end of output inductor $L_0$. The second end of the inductor is connected to output capacitor $C_0$. The second end of winding $N_{S1}$ is connected to synchronous rectifier $S_1$ while the second end of winding $N_{S2}$ is connected to synchronous rectifier $S_2$. For a basic full-bridge converter, the polarity of the windings is chosen such that: (a) when switches $Q_{10}$ and $Q_{30}$ are on, $S_1$ is on and $S_2$ is off; (b) when switches $Q_{20}$ and $Q_{40}$ are on, synchronous rectifier $S_2$ is on and synchronous rectifier $S_1$ is off; and (c) when all four primary side switches, $Q_{10}$, $Q_{20}$, $Q_{30}$ and $Q_{40}$, are off both $S_1$ and $S_2$ are on and all three windings of power transformer $T_2$ are shorted.

Output voltage $V_{OUT}$ is compared with reference voltage $V_R$ in block 100 (comprising reference $V_R$ and an error amplifier with a compensation network) as shown in FIG. 1B. The output of block 100 is fed into isolation circuit 101 (usually an opto-coupler or isolation transformer) and error signal $V_E$ is fed into controller block 102 which comprises, for example, but is not limited to, a PWM controller, two driver stages generating out-of-phase outputs OUTA and OUTB, and ON/OFF logic. Block 102 may also contain additional protection features very often found in converters. However, they are not relevant for the purpose of this description, and are thus omitted. Driver outputs OUTA and OUTB are capable of driving two primary side switches simultaneously ($Q_{10}$ and $Q_{30}$, and $Q_{20}$ and $Q_{40}$) as well as supplying magnetizing current to drive transformer $T_1$. Note that in FIG. 1A the controller and drivers OUTA and OUTB are referenced to $V_{IN}$ and thus to the input of the converter.

Drive transformer $T_1$ has five windings, $N_1$ to $N_5$ (FIG. 1A). Their leakage inductances are illustrated explicitly in FIG. 1A as external inductances $L_1$, $L_2$, $L_3$, $L_4$ and $L_5$. Winding $N_5$ is driven from block 102 with signals OUTA and OUTB. Capacitor $C_1$ serves as a dc blocking capacitor. Winding $N_1$ is connected with one end to the source of transistor $Q_{10}$ and the second end is connected to the gate of transistor $Q_{10}$ via series diode $D_{10}$ and resistor $R_5$. Resistor $R_5$ is connected in series with diode $D_{10}$ in order to dampen oscillations on the gate of $Q_{10}$ caused by resonance between leakage inductance $L_1$ and the input capacitance of transistor $Q_{10}$. Transistor $Q_1$, shown as a p-channel MOSFET, is connected across the gate and source of $Q_{10}$ with its gate connected via resistor $R_3$ to the end of winding $N_1$ marked with dot polarity. Resistor $R_{10}$, connected across the gate and source of transistor $Q_{10}$, is used to increase the noise immunity of $Q_{10}$ when the voltage across winding $N_1$ is zero. Resistor $R_3$ is connected in series with the gate of transistor $Q_1$ in order to dampen any undesirable oscillations caused between the input capacitance of transistor $Q_1$ and the leakage inductance $L_1$ of winding $N_1$.

Similarly, winding $N_2$ is connected with one end to the source of transistor $Q_{40}$ and the second end is connected to the gate of transistor $Q_{40}$ via series diode $D_{40}$ and resistor $R_{41}$. Resistor $R_{41}$ is connected in series with diode $D_{40}$ in order to dampen oscillations on the gate of transistor $Q_{40}$ caused by resonance between leakage inductance $L_2$ and input capacitance of transistor $Q_{40}$. Transistor $Q_4$, shown as a p-channel MOSFET, is connected across the gate and source of transistor $Q_{40}$ with its gate connected via resistor $R_9$ to the end of winding $N_2$ without the dot marking. Resistor $R_{40}$, connected across the gate and source of transistor $Q_{40}$, is used to increase the noise immunity of $Q_{40}$ when the voltage across winding $N_2$ is zero. Resistor $R_9$ is connected in series with the gate of transistor $Q_4$ in order to dampen any undesirable oscillations caused between the input capacitance of $Q_4$ and the leakage inductance $L_2$ of winding $N_2$.

Winding $N_4$ is used to drive the two bottom primary switches $Q_{20}$ and $Q_{30}$ connected to the negative side of the input voltage $(-V_{IN})$. Each end of winding $N_4$ is connected to $-V_{IN}$ with diodes $D_{50}$ and $D_{60}$. The end of winding $N_4$ marked with dot polarity (and also marked as point "A" in FIG. 1A) is connected via a series connection with diode $D_{30}$ and resistor $R_8$ to the gate of transistor $Q_{30}$. Transistor $Q_3$, shown as a p-channel MOSFET, is connected across the gate and source of transistor $Q_{30}$ with its gate connected via resistor $R_7$ to end "A" of winding $N_4$. Resistor $R_8$ is connected in series with diode $D_{30}$ in order to dampen oscillations on the gate of transistor $Q_{30}$ caused by resonance between leakage inductance $L_4$ and input capacitance of primary switch $Q_{30}$. Resistor $R_{30}$, connected across the gate and source of transistor $Q_{30}$, is used to increase the noise immunity of $Q_{30}$ when the voltage across winding $N_4$ is zero. Resistor $R_7$ is connected in series with the gate of $Q_3$ in order to dampen any undesirable oscillations caused between the input capacitance of $Q_3$ and leakage inductance $L_4$ of winding $N_4$. Resistor $R_{60}$ is connected in order to keep $Q_3$ off by connecting its gate to its drain when the voltage on winding $N_4$ is zero.

The end of winding $N_4$ not marked by dot polarity (and also marked as point "B" in FIG. 1A) is connected via a series connection of diode $D_{20}$ and resistor $R_6$ to the gate of transistor $Q_{20}$. Resistor $R_6$ is connected in series with diode $D_{20}$ in order to dampen oscillations on the gate of $Q_{20}$ caused by resonance between leakage inductance $L_4$ and the input capacitance of primary switch $Q_{20}$. Transistor $Q_2$, shown as a p-channel MOSFET, is connected across the gate and source of transistor $Q_{20}$ with its gate connected via resistor $R_4$ to end "B" of winding $N_4$. Resistor $R_{20}$, connected across the gate and source of transistor $Q_{20}$, is used to increase noise immunity of $Q_{20}$ when the voltage across winding $N_4$ is zero. Resistor $R_4$ is connected in series with the gate of transistor $Q_2$ in order to dampen any undesirable oscillations caused between the input capacitance of $Q_2$ and leakage inductance $L_4$ of winding $N_4$. Resistor $R_{70}$ is used in order to keep transistor $Q_2$ off by connecting its gate to its drain when the voltage on winding $N_4$ is zero.

Winding $N_3$ is connected to the drive circuitry for synchronous rectifiers $S_1$ and $S_2$. The end of winding $N_3$ marked by dot polarity (also marked as point "D" in FIGS. 1A and 1B) is connected to one input of logic OR gate $U_3$ and to one end of resistor $R_{22}$. The second end of resistor $R_{22}$ is connected to the ground of $U_3$. The other end of winding $N_3$, not marked by a dot (also marked as point "C" in FIGS. 1A and 1B) is connected to one input of logic OR gate $U_1$ and to one end of resistor $R_{21}$. The second end of resistor $R_{21}$ is connected to the ground of $U_1$.

It is assumed that each input of logic gates $U_1$ and $U_3$ has protection diodes from ground to input and from input to supply voltage $V_{CCS}$. Capacitor $C_4$ serves as a bypass capacitor across $V_{CCS}$. If logic gates without these protection diodes are used, then external diodes need to be added for proper operation of the circuit (diodes $D_3$-$D_{10}$ are shown as external diodes in FIG. 1B). Supply voltage $V_{CCS}$ is usually generated from the windings of main transformer $T_2$ or from a separate bias circuit from the primary side with proper isolation. Drive transformer $T_1$ can also provide the necessary supply voltage $V_{CCS}$ via winding $N_3$ and diodes $D_5$, $D_6$, $D_8$ and $D_{11}$. The second input of logic gate $U_1$ is connected through resistor $R_{23}$ to the drain of synchronous rectifier $S_1$, and similarly, the second input of logic gate $U_3$ is connected through resistor $R_{24}$ to the drain of synchronous rectifier $S_2$. These two inputs provide break-before-make turn-on for both $S_1$ and $S_2$. The voltages on the inputs of $U_1$ and $U_3$ are clamped to $V_{CCS}$ with diodes $D_4$ and $D_7$, respectively. The output of $U_1$ is connected to the input of inverting driver $U_2$, which drives $S_1$, while the output of $U_3$ is connected to the input of inverting driver $U_4$, which drives $S_2$. Resistors $R_{21}$ and $R_{22}$ are used for dampening possible oscillations between leakage inductance $L_3$ and the input capacitance of logic gates $U_1$ and $U_3$.

As mentioned previously, $L_1$, $L_2$ and $L_4$ are the leakage inductances associated with windings $N_1$, $N_2$ and $N_4$, of drive transformer $T_1$, respectively. These three inductances are purposely made larger than usual in order to delay turn-on of primary switches $Q_{10}$, $Q_{20}$, $Q_{30}$ and $Q_{40}$. They are carefully designed to have leakage inductances that are very close in value to further increase the efficiency and simplicity of the circuit. This is relatively easy to do if the transformer windings are formed on a multi-layer printed circuit board (PCB). In addition, repeatability and control in manufacturing are excellent. Typical values for these inductances are approximately 100 nH and higher. They are designed so that one-fourth of the period of oscillation caused by the input capacitance of primary switches $Q_{10}$, $Q_{20}$, $Q_{30}$ and $Q_{40}$ and leakage inductances of corresponding windings $N_1$, $N_4$ and $N_2$ ($L_1$, $L_4$ and $L_2$) is longer than the turn-off time of the secondary synchronous rectifying switches $S_1$ and $S_2$.

The leakage inductance $L_3$ of winding $N_3$ of drive transformer $T_1$ is not critical since winding $N_3$ is loaded with a high impedance load (resistors $R_{21}$ and $R_{22}$ have a typical value of at least few kOhms), and also taking into consideration the input capacitance of logic gates $U_1$ and $U_3$ (5 pF-10 pF being typical). Thus, inductance $L_3$ will not have a significant impact on the rising and falling edges of the voltage waveforms across winding $N_3$ and consequently will not add any additional delay in turning off synchronous rectifiers $S_1$ and $S_2$. The leakage inductance $L_5$ of winding $N_5$ is designed such that in conjunction with leakage inductances $L_1$, $L_2$ and $L_4$, proper delay is achieved in turning on the primary switches.

Figure 1C:
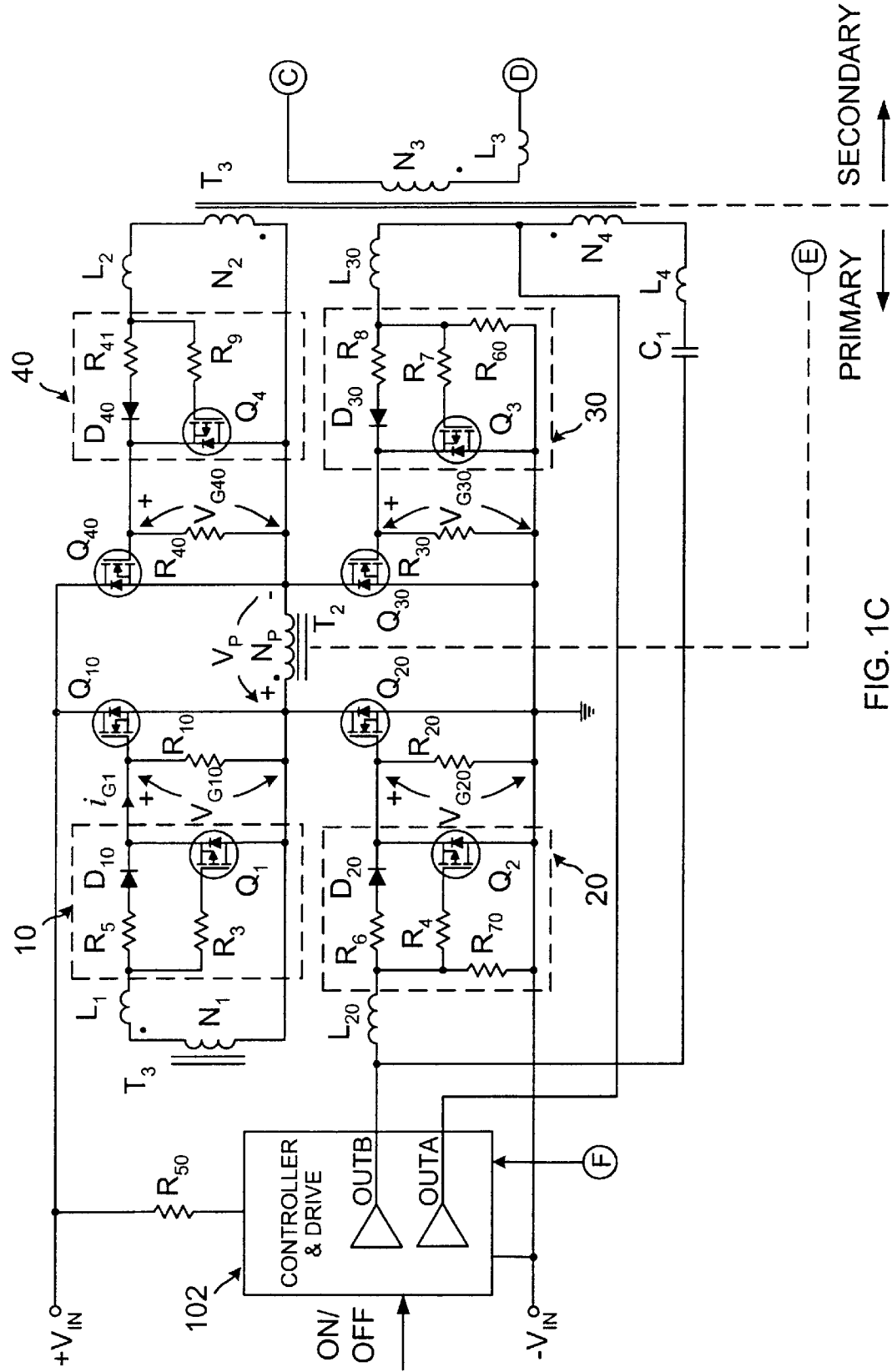
FIG. 1C is an embodiment of the invention similar to FIG. 1A, having four windings on the drive transformer and two external inductances for driving two bottom switches.

An alternative embodiment to the invention illustrated in FIG. 1A is shown in FIG. 1C. In this circuit, drive transformer $T_3$ has four windings. Winding $N_4$ is connected to OUTA and OUTB of controller 102 via series dc blocking capacitor C, and has combined the functions of windings $N_5$ and $N_4$ from FIG. 1A. Two bottom primary side switches, $Q_{30}$ and $Q_{20}$, are driven from OUTA and OUTB via series inductors $L_{30}$ and $L_{20}$, respectively. External inductors $L_{20}$ and $L_{30}$ have the same value for leakage inductance as $L_4$ from FIG. 1A. The rest of the circuitry is the same as in FIG. 1A. An advantage of the embodiment in FIG. 1C, as compared to that of FIG. 1A, is that the drive transformer is simpler with only four windings versus five. On the other hand, two extra components, inductances $L_{20}$ and $L_{30}$ are needed. In applications in which a multilayer PCB is used, the drive transformer $T_1$ from FIG. 1A may be preferable since it eliminates the need for inductances $L_{20}$ and $L_{30}$, and their associated cost and space on the PCB. Operations of the FIGS. 1A and 1C circuits are very similar.

Figure 2:
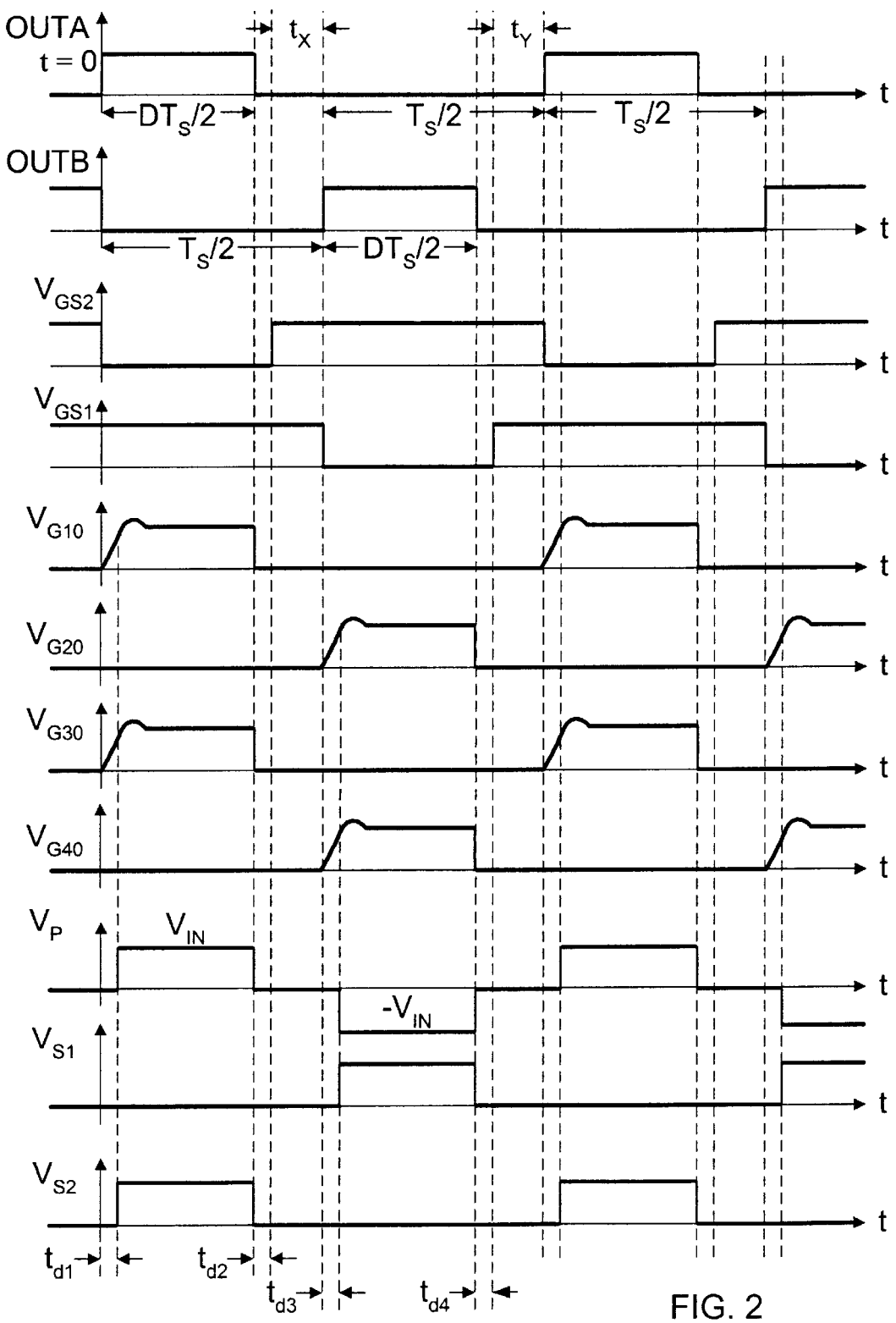
FIG. 2 shows the salient waveforms of an embodiment of the invention, taken at several locations in the circuit from FIGS. 1A and 1B.

The salient waveforms for operational understanding of the circuit from FIGS. 1A and 1B are provided in FIG. 2. For simplicity, it is assumed that all primary switches $Q_{10}$, $Q_{20}$, $Q_{30}$ and $Q_{40}$ are identical, and that synchronous rectifiers $S_1$ and $S_2$ are identical as well as are leakage inductances $L_1$, $L_2$ and $L_4$. It should be noted that the invention is not limited to these assumptions. Also, for simplicity it is assumed that leakage inductance $L_5 \approx 0$. In these waveforms:

$t_{d1}$—time between turning-off synchronous rectifier $S_2$ and turning-on switches $Q_{10}$ and $Q_{30}$. This is determined by leakage inductances $L_1$ and $L_4$ of windings $N_1$ and $N_4$ of transformer $T_1$ and the input capacitances of $Q_{10}$ and $Q_{30}$.

$t_{d2}$—time delay between turning-off switches $Q_{10}$ and $Q_{30}$ and turning-on synchronous rectifier $S_2$. The drive signal for turning on $S_2$ is applied when the voltage $V_{S2}$ across $S_2$ is below the threshold of logic gate $U_3$. Resister $R_{24}$ and the input capacitance of $U_3$ provide fine-tuning of the delay. During this time the output capacitance of $S_2$ is discharged with the output inductor current, thus $S_2$ has a near zero voltage.

$t_x$—time during which all primary side switches are off, both $S_1$ and $S_2$ are on and all windings of $T_2$ are shorted. Inductor current splits in between $S_1$ and $S_2$.

$t_{d3}$—time between turning-off $S_1$ and turning-on switches $Q_{20}$ and $Q_{40}$. It is determined by the leakage inductances $L_2$ and $L_4$ of windings $N_2$ and $N_4$ of drive transformer $T_1$ and input capacitances of $Q_{20}$ and $Q_{40}$. In practice, $td_1 \approx td_3$.

$t_{d4}$—time delay between turning-off switches $Q_{20}$ and $Q_{40}$ and turning-on synchronous rectifier $S_1$. The drive signal for turning on $S_1$ is applied when the voltage $V_{S1}$ across $S_1$ is below the threshold of logic gate $U_1$. Resister $R_{23}$ and the input capacitance of logic gate $U_1$ provide fine tuning of this delay. The output capacitance of $S_1$ is discharged by the output inductor current during this time, thus $S_2$ is turned-on at near zero voltage. In practice, $td_2 \approx td_4$.

$t_y$—time during which all primary side switches are off, both $S_1$ and $S_2$ are on and all windings of $T_2$ are shorted. The inductor current splits between $S_1$ and $S_2$. In practice, $t_x \approx t_y$.

At t=0, OUTA (of the controller, for example PWM type) becomes high, while OUTB is low. The voltage across all windings of $T_1$ is positive. Note that the dot polarity next to one end of the windings of the transformer is used for reference and is now positive with respect to other side of the windings. The voltage across winding $N_3$ is positive and the end of winding $N_3$ connected to the input of $U_1$ (marked as point "C" in FIG. 1B) is clamped with an internal diode (shown as external diode $D_6$) to the negative voltage equal to the forward voltage drop of the diode. Since the voltage at point "D" is positive, the output of $U_3$ goes high and the output of $U_4$ goes low, causing turn-off of synchronous rectifier $S_2$ with minimum delay. On the other hand, since the voltage at point "C" is low, the output of $U_1$ is low and $U_2$ is high which keeps synchronous rectifier $S_1$ on. At the same time a positive voltage is applied across windings $N_1$ and $N_4$. Due to the positive voltage on winding $N_1$, diode $D_{10}$ becomes forward biased and the input capacitance of primary switch $Q_{10}$ starts to be charged in resonant manner via leakage inductance $L_1$ of winding $N_1$, resistor $R_5$ and diode $D_{10}$. Due to positive voltage on its gate, transistor $Q_1$ is off. At the same time, positive voltage across winding $N_4$ makes diode $D_{50}$ forward biased while diode $D_{60}$ is reverse biased. The end of winding $N_4$ marked with point "B" is connected to $-V_{IN}$ via diode $D_{50}$. The input capacitance of primary switch $Q_{30}$ starts to be charged in a resonant manner via leakage inductance $L_4$, resistor $R_8$ and diode $D_{50}$ Transistor $Q_3$ is off due to a positive voltage on its gate. At $t=t_{d1}$, voltages $V_{G10}$ and $V_{G30}$ have reached the threshold level and switches $Q_{10}$ and $Q_{30}$ are fully on. Positive voltages across windings $N_4$ and $N_2$ keep transistors $Q_2$ and $Q_4$ on and consequently $Q_{20}$ and $Q_{40}$ are kept off. The body diode of transistor $Q_2$ clamps a negative voltage across primary switch $Q_{20}$ to near zero during time $DT_S/2$, while $D_{20}$ is reverse biased. Similarly, the body diode of transistor $Q_4$ clamps negative voltage across $Q_{40}$ to near zero during time $DT_S/2$, while $D_{40}$ is reverse biased. Clamping negative voltage on transistors $Q_{20}$ and $Q_{40}$ during off time is preferred in order to reduce gate drive losses. During time $DT_S/2 - t_{d1}$, the voltage across the windings of transformer $T_2$ is positive and output inductor current is supplied from input to output through winding $N_{S1}$. The voltage across $S_2$ is also positive.

At $t=DT_S/2$, OUTA becomes low (OUTB is still low), winding $N_5$ is shorted and voltages across the other four windings of $T_1$ are near zero. Zero voltage across winding $N_1$ connects the gate to drain of transistor $Q_{10}$ via resistor $R_3$, while the gate of $Q_3$ is connected via resistor $R_{60}$ to its drain. Transistors $Q_1$ and $Q_3$ are turned-on, diodes $D_{10}$ and $D_{30}$ are reverse biased, the input capacitances of $Q_{10}$ and $Q_{30}$ are discharged very quickly via ON resistance of $Q_1$ and $Q_3$ and voltages $V_{G10}$ and $V_{G30}$ rapidly drop to zero, resulting in turn-off of $Q_{10}$ and $Q_{30}$. The current in output inductor $L_0$ splits between synchronous rectifier $S_1$ and the body diode of synchronous rectifier $S_2$, which as a consequence, has shorted windings of transformer $T_2$. As soon as the voltage across $S_2$ drops down to the logic zero threshold of $U_3$, the output of $U_3$ goes low (since the input connected to winding $N_3$ is zero), and the output of $U_4$ goes high and synchronous rectifier $S_2$ is turned-on (time interval $t_{d2}$). Both $S_1$ and $S_2$ are on during the rest of the half of the switching period and the voltages across the windings of $T_1$ and $T_2$ are zero (time interval $t_x$).

At t=TS/2, OUTB goes high while OUTA is still low. The voltage across all windings of $T_1$ is negative (referenced to the dot marking). The voltage across winding $N_3$ is negative and the end of winding $N_3$ connected to the input of $U_3$ (marked as point "D" in FIG. 1B) is clamped with an internal diode (shown as external diode $D_{11}$) to the negative voltage equal to the forward voltage drop of the diode. Since the voltage at point "C" is positive, the output of $U_1$ goes high and the output of $U_2$ goes low, causing turn-off of $S_1$ with minimum delay. On other hand, since the voltage at point "D" is low, the output of $U_3$ is low and $U_4$ is high which keeps $S_2$ on. At the same time negative voltage is applied across windings $N_2$ and $N_4$. Due to negative voltage on winding $N_2$, diode $D_{40}$ becomes forward biased and the input capacitance of $Q_{40}$ starts to be charged in a resonant manner via leakage inductance $L_2$ of winding $N_2$ resistor $R_{41}$ and diode $D_{40}$. Due to a positive voltage on its gate, transistor $Q_4$ is off. At the same time, negative voltage across winding $N_4$ (point "B" is more positive than point "A") makes diode $D_{20}$ forward biased while diode $D_{50}$ is reverse biased. The end of winding $N_4$ marked as point "A" is connected to $-V_{IN}$ via diode $D_{60}$. The input capacitance of $Q_{20}$ starts to be charged in resonant manner via leakage inductance $L_4$ of winding $N_4$, resistor $R_6$ and diode $D_{60}$. Due to a positive voltage on its gate, transistor $Q_2$ is off. At $t=t_{d1}$, voltages $V_{G10}$ and $V_{G30}$ are positive and transistors $Q_{10}$ and $Q_{30}$ are fully on. The negative voltage across windings $N_1$ and $N_4$ keeps transistors $Q_1$ and $Q_3$ on and consequently $Q_{10}$ and $Q_{30}$ are off. The body diode of $Q_1$ clamps a negative voltage across $Q_{10}$ to near zero during time $DT_S/2$, while diode $D_{10}$ is reverse biased. Similarly, the body diode of $Q_3$ clamps negative voltage across $Q_{30}$ to near zero during time $DT_S/2$, while $D_{30}$ is reverse biased. Clamping a negative voltage on $Q_{10}$ and $Q_{30}$ during off time is desirable in order to reduce gate drive losses. During time $DT_S/2-t_{d3}$, the voltage across the windings of transformer $T_2$ is negative and the output inductor current is supplied from input through winding $N_{S2}$. The voltage across synchronous rectifier $S_1$ is positive.

At $t=TS/2+DT_S/2$, OUTB becomes low (OUTA is still low), winding $N_5$ is shorted and the voltages across the other four windings of $T_1$ are near zero. Zero voltage across winding $N_2$ connects the gate to drain of transistor $Q_4$ via resistor $R_9$, while the gate of $Q_2$ is connected via resistor $R_{70}$ to its drain. Transistors $Q_2$ and $Q_4$ are turned-on, diodes $D_{20}$ and $D_{40}$ are reverse biased, input capacitances of $Q_{20}$ and $Q_{40}$ are discharged very quickly via the ON resistance of $Q_2$ and $Q_4$, and voltages $V_{G20}$ and $V_{G40}$ rapidly drop to zero resulting in turn-off of $Q_{20}$ and $Q_{40}$. Switches $Q_{10}$ and $Q_{30}$ are kept off. The current in output inductor $L_O$ splits between synchronous rectifier $S_2$ and the body diode of $S_1$, which as a consequence has shorted the windings of transformer $T_2$. As soon as voltage across synchronous rectifier $S_1$ drops down to the logic zero threshold of logic gate $U_1$, the output of $U_1$ goes low (since the input connected to winding $N_3$ is zero), the output of $U_2$ goes high and synchronous rectifier $S_1$ is turned-on (time interval $t_{d2}$). Both synchronous rectifiers $S_1$ and $S_2$ are on during rest of the half of the switching period and voltages across the windings of $T_1$ and $T_2$ are zero (time interval $t_y$). The overshoot in gate voltage waveforms of the primary side switches, as shown in FIG. 2, is due to the resonant charging of input capacitances of these switches. The amplitude of the overshoot depends on the Q-factor of the resonant circuit formed by the leakage inductance of the winding, the input capacitance of the switch and the series connection of the resistor and diode in the drive circuit.

Figure 3:
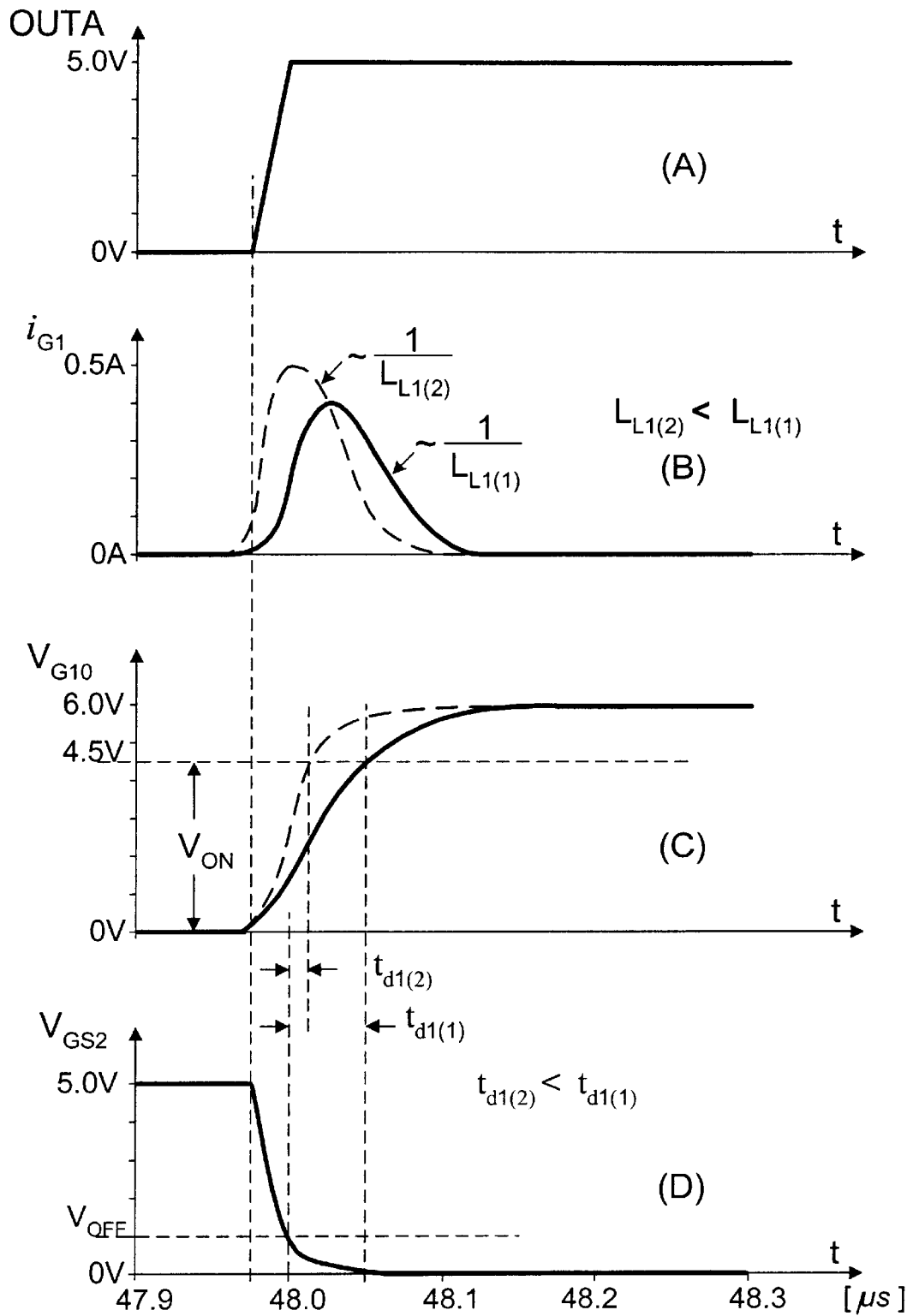
FIG. 3 shows the turn-on waveforms of a primary side switch in the FIGS. 1A and 1B circuit with reduced leakage inductance of one winding.

The turn-on waveforms of primary switch $Q_{10}$ (as an example) are shown in more detail in FIG. 3 for two different values of leakage inductance $L_1$, $L_{1(1)}$ and $L_{1(2)}$, in order to explain the turn-on delay of primary switch $Q_{10}$ due to the finite rise time of the current in leakage inductance $L_1$ of winding $N_1$. It is assumed that there is no overshoot in gate voltage. Note that the other three primary switches, $Q_{20}$, $Q_{30}$ and $Q_{40}$ have the same gate drive waveforms. The lower value of leakage inductance $L_1$, denoted $L_{1(2)}$, allows a higher peak current for charging the input capacitance of $Q_{10}$ and consequently it allows for a faster turn-on of $Q_{10}$ and shorter delay between turning-off of $S_2$ and turning-on of $Q_{10}$. Note that voltage level $V_{ON}$ in waveform (C) in FIG. 3 represents the voltage level of $V_{G10}$ at which $Q_{10}$ is fully on, and $t_{d1}$ (either $t_{d1(1)}$ or $t_{d1(2)}$) is the so called "dead time" and represents time during which both synchronous rectifier $S_2$ and primary switch $Q_{10}$ are off. This dead time is necessary in order to avoid cross conduction of synchronous rectifier $S_2$ and primary switch $Q_{10}$ and $Q_{30}$ (and $S_1$ and $Q_{20}$ and $Q_{40}$). Dead time, $t_{d1}$ (equivalently, $t_{d2}$), should be minimized because, during this time the body diode of $S_2$ (equivalently, $S_1$) is carrying half of the output inductor current, thus decreasing efficiency of the converter. If the dead time is too short, that is $Q_{10}$ and $Q_{30}$ are turned-on before $S_2$ is turned-off, there will be cross-conduction that would result in efficiency drop. Therefore, it is important to have well-controlled dead times in order to have the highest efficiency. With proper design of leakage inductances and repeatability in manufacturing, dead time is optimized for highest efficiency.

Figure 4:
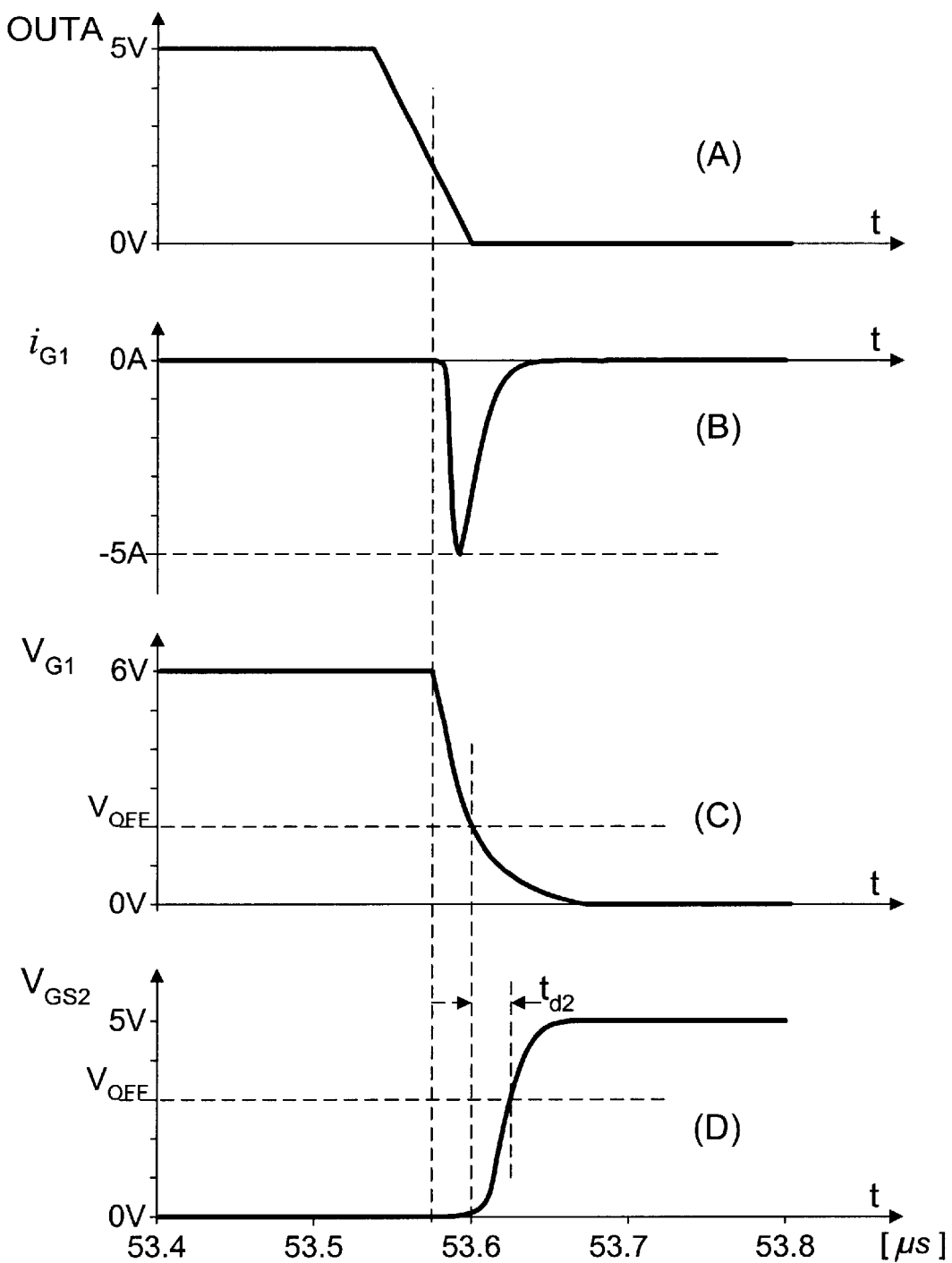
FIG. 4 shows the turn-off waveforms of a primary side switch in FIGS. 1A and 1B.

The turn-off waveforms for primary switch $Q_{10}$ (the same apply for $Q_{20}$, $Q_{30}$ and $Q_{40}$) are shown in more detail in FIG. 4. Since diode $D_{10}$ becomes reverse biased when OUTA goes low, the discharging current of the input capacitance of $Q_{10}$ is going through transistor $Q_1$ and is limited, in first approximation, only by the ON resistance and turn-on characteristic of $Q_{10}$ but not affected by leakage inductance $L_1$. The presence of leakage inductance is desirable during the turn-off transient since the leakage inductance generates a negative spike, which improves the turn-on of $Q_1$. In this manner, a very fast and well-controlled turn-off of $Q_{10}$ (as well as of $Q_{20}$, $Q_{30}$ and $Q_{40}$) is achieved. By varying the resistance of switches $Q_1$ through $Q_4$, the turn-off performance of switches $Q_{10}$, $Q_{20}$, $Q_{30}$ and $Q_{40}$ can be adjusted to a preferred value.

While the turn-on of primary switches $Q_{10}$, $Q_{20}$, $Q_{30}$ and $Q_{40}$ are delayed (slowed down) by leakage inductances $L_1$, $L_2$, and $L_4$ respectively, turn-off is very fast due to switches $Q_1$ through $Q_4$ and their low on resistances. By placing switches $Q_1$ through $Q_4$ physically close to primary switches $Q_{10}$, $Q_{20}$, $Q_{30}$ and $Q_{40}$, respectively, maximum speed for turning off switches $Q_{10}$, $Q_{20}$, $Q_{30}$ and $Q_{40}$ can be achieved. Note that the turn-off performance of switches $Q_{10}$, $Q_{20}$, $Q_{30}$ and $Q_{40}$ is not significantly affected by the leakage inductances $L_1$, $L_2$, $L_4$ which allows independent control of turn-on and turn-off transients. Also, it is preferable for EMI (electromagnetic interference) purposes to have the turn-on of switches $Q_{10}$, $Q_{20}$, $Q_{30}$ and $Q_{40}$ slowed down.

Figure 5A:
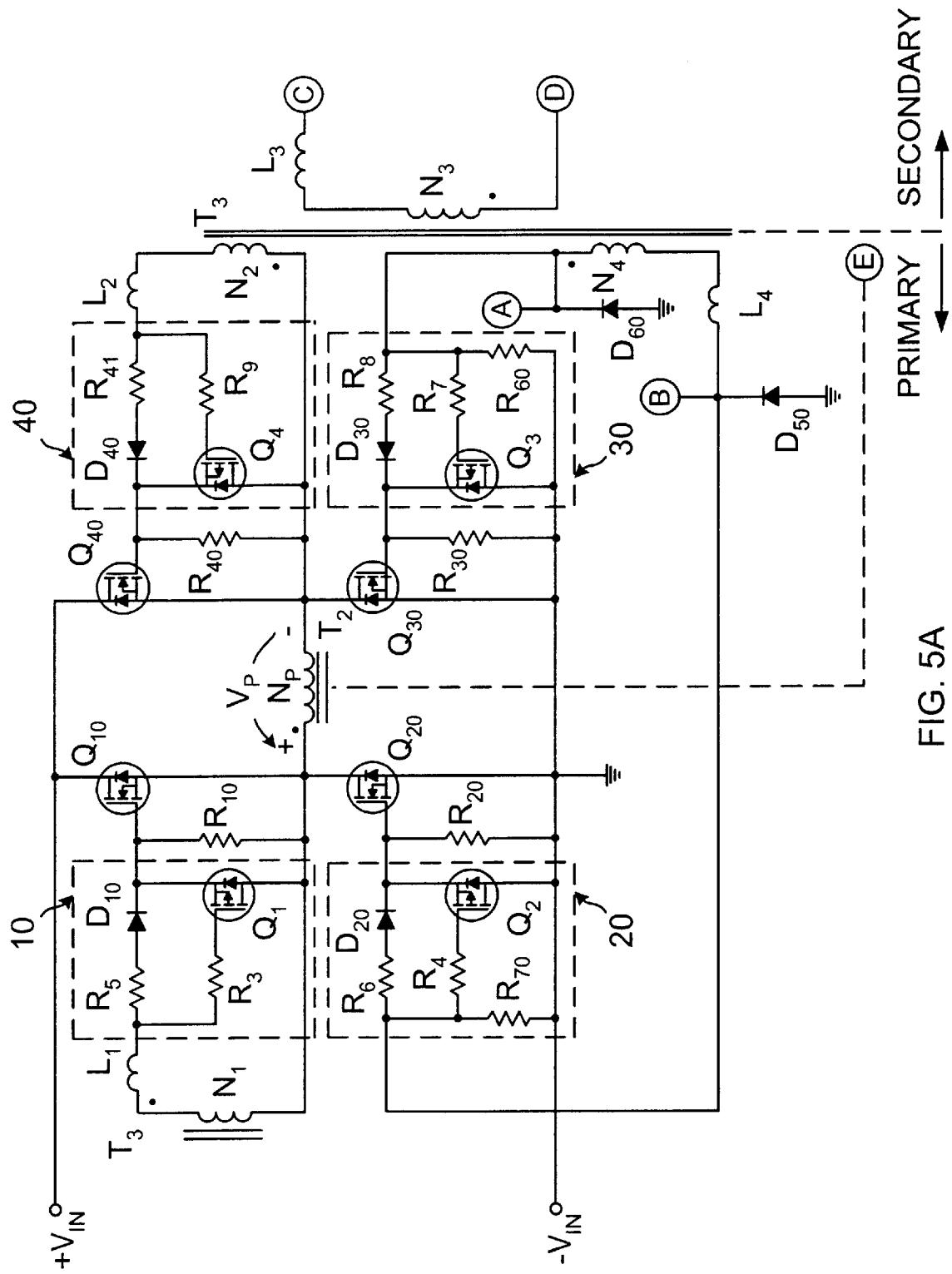
FIGS. 5A and 5B comprise circuit diagram of an embodiment of the invention using a full-bridge converter with the control and drive circuit referenced to the output side of the converter.
Figure 5B:
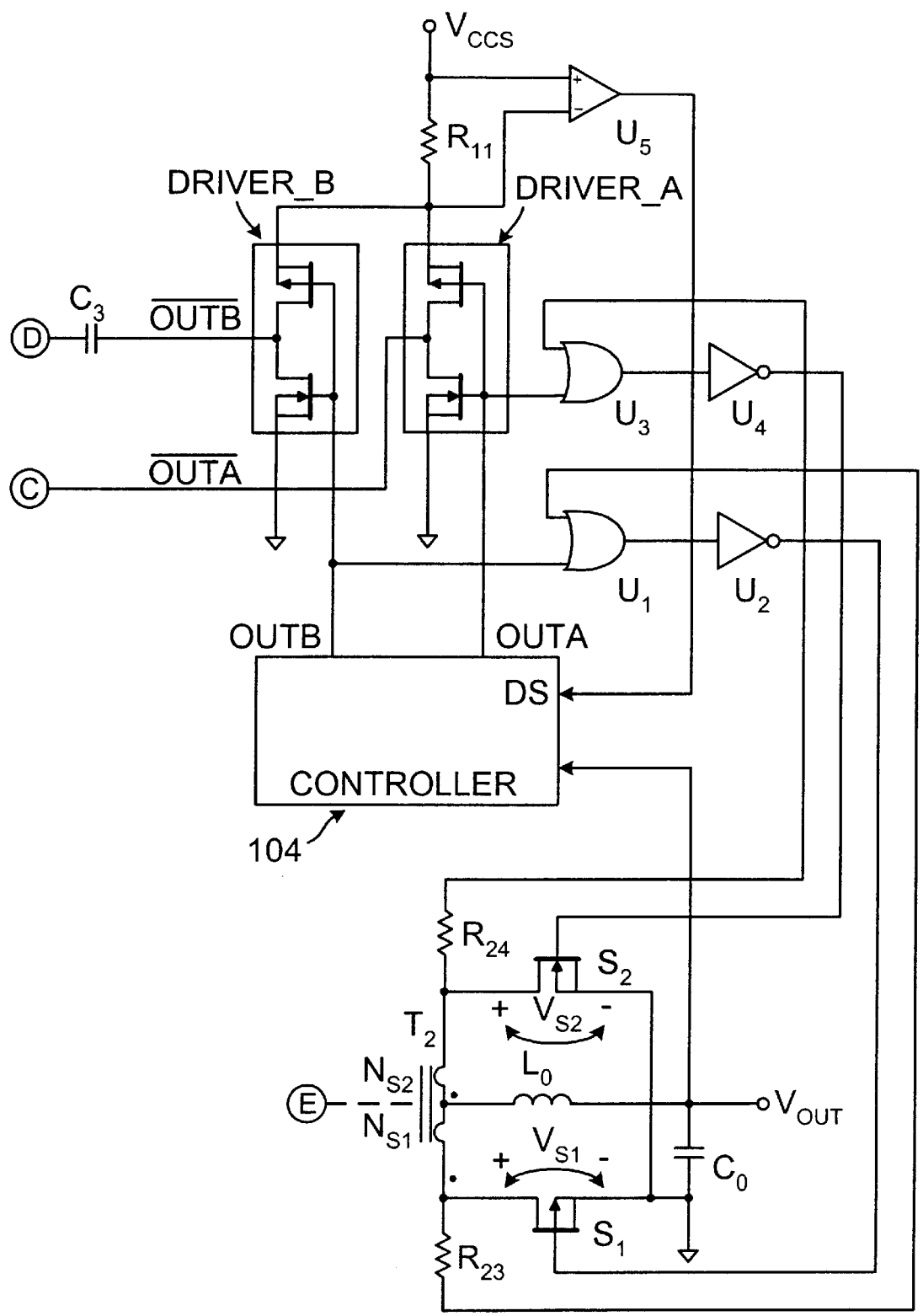
Figure 5C:
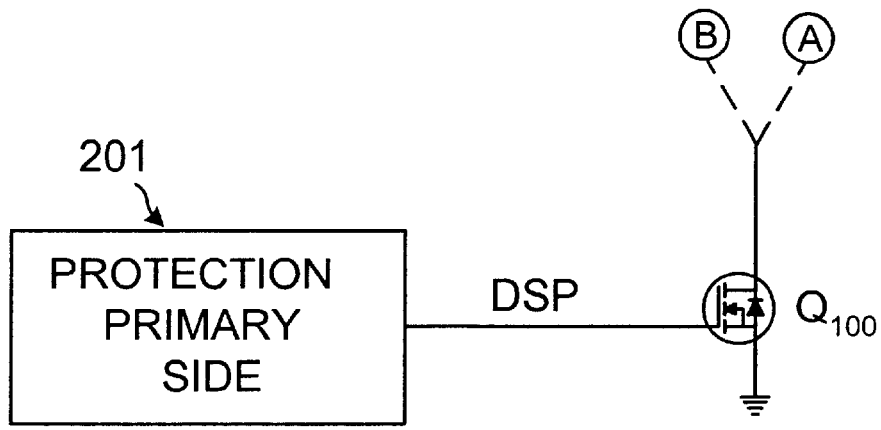
FIG. 5C is an alternative circuit embodiment of the invention to facilitate disabling the control circuit, referenced to the output, from a condition sensed on the input side of the converter.

As an alternative, if the control and drive circuit is referenced to the output of the converter, winding $N_5$ (from the FIG. 1A embodiment) is not needed, as shown in FIGS. 5A and 5B. In this case, OUTA and OUTB are generated from controller 104 referenced to the output side of the converter and are directly connected to one input of logic gates $U_3$ and $U_1$. Winding $N_3$ is connected via dc blocking capacitor $C_3$ to the inputs of the two inverting drivers DRIVER_A and DRIVER_B which are controlled by OUTA and OUTB, respectively. The salient waveforms shown in FIG. 2 are still valid for the circuit in FIGS. 5A and 5B. For simplicity, diodes $D_3$ through $D_{10}$ shown in FIG. 1B are omitted and it is assumed that they are integrated into logic gates $U_1$ and $U_3$. Also, only block 104 incorporating the controller, drive and protection circuitry as well as regulation circuitry, is shown in FIG. 5B and its specific realization is insignificant to the description. Supply voltage for controller 104 and $U_1$ through $U_4$ is referenced to the output of the converter and can be generated in different ways which are not relevant for the operation of the drive circuit and thus not shown in FIG. 5B. FIGS. 5B and 5C are to be discussed later herein.

Figure 6:
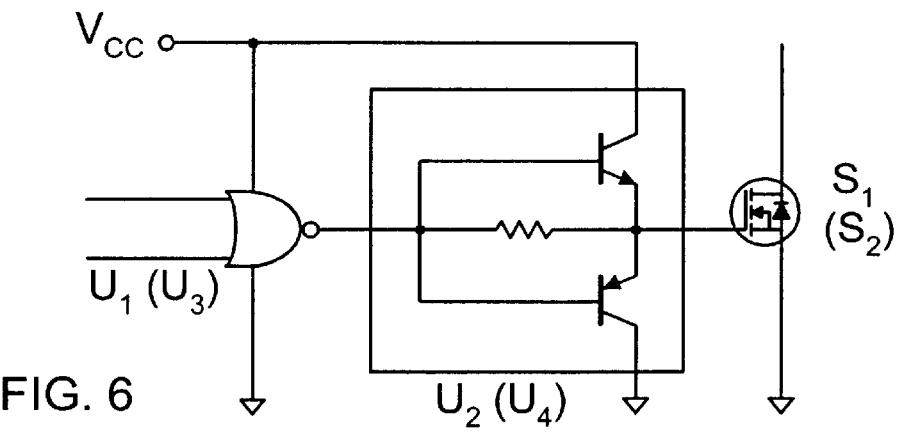
FIG. 6 is a partial circuit diagram for a possible realization of a driver for the synchronous rectifiers of an embodiment of the invention using bipolar transistors.
Figure 7:
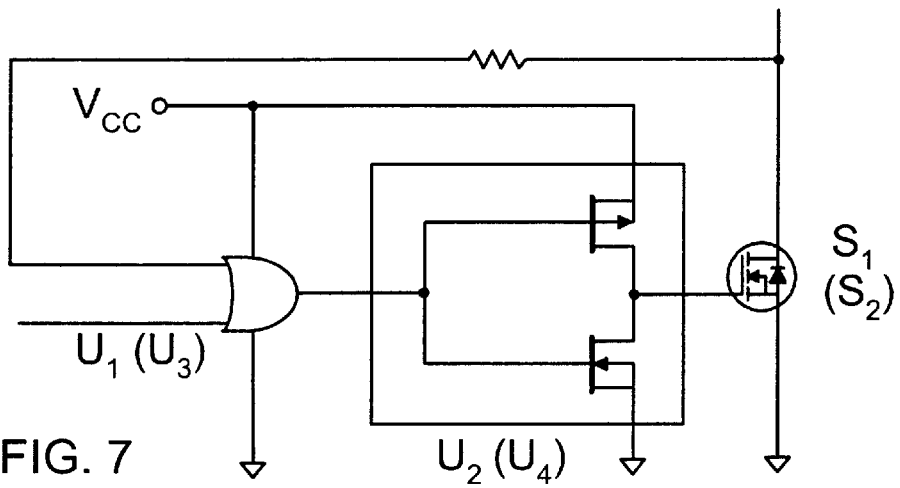
FIG. 7 is an alternative circuit diagram for a possible realization of a driver for the synchronous rectifiers of an embodiment of the invention using MOSFETs.
Figure 8:
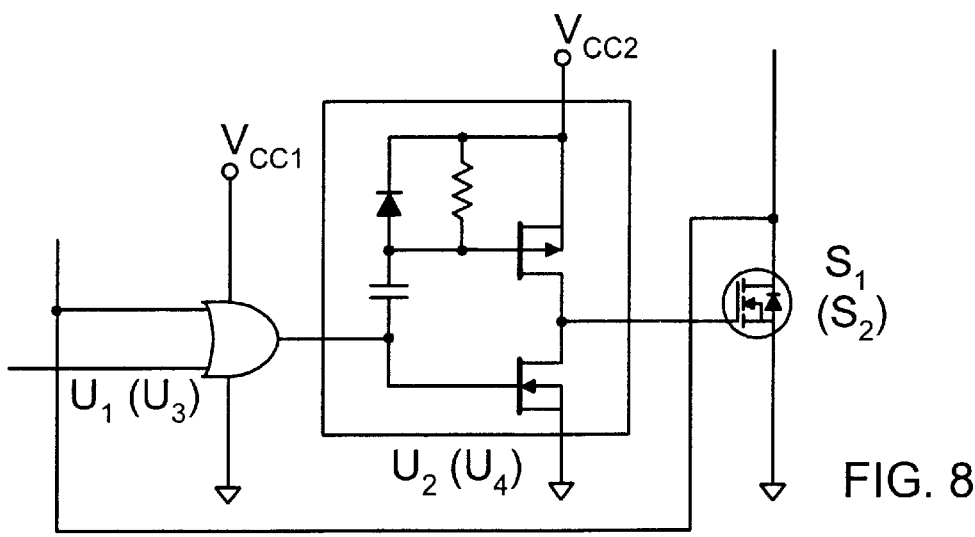
FIG. 8 is yet another partial circuit diagram for a possible realization of a driver for synchronous rectifiers of an embodiment of the invention with MOSFETs.

Illustrated in FIGS. 6, 7 and 8 are partial circuitry embodiments for possible realization of drivers $U_2$ and $U_4$. In FIG. 6, logic gate $U_1$ ($U_3$) is a NOR gate instead of an OR gate since driver stage $U_2$ ($U_4$) is non-inverting. The drivers operate the same way so only $U_2$ (and not $U_4$) is shown. In FIGS. 7 and 8, driver stage $U_2$ ($U_4$) is inverting and logic gate $U_1$ ($U_3$) is an OR gate as in FIGS. 1B and 5B. In FIG. 8, driver stage $U_2$ ($U_4$) allows synchronous rectifier $S_1$ ($S_2$) to be driven with a voltage higher than the supply voltage for logic gate $U_1$ ($U_3$). Practical realizations of drivers $U_2$ and $U_4$, different from those in FIGS. 6, 7 and 8, are also possible.

Figure 9A:
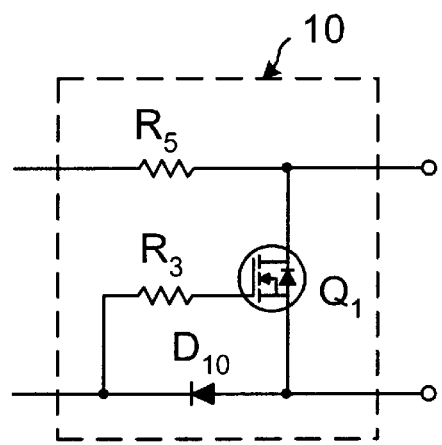
FIGS. 9A and 9B are alternative partial circuit diagrams for a possible realization of drivers for the top primary side switches with n-channel MOSFETs.
Figure 9B:
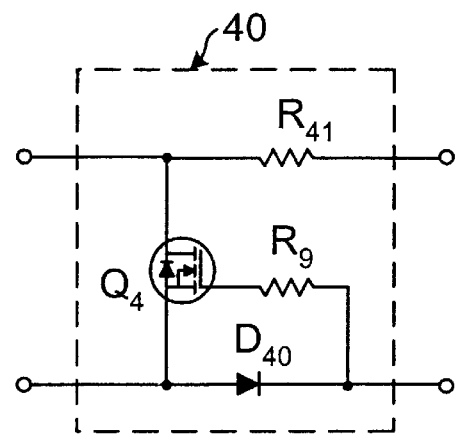
Figure 10A:
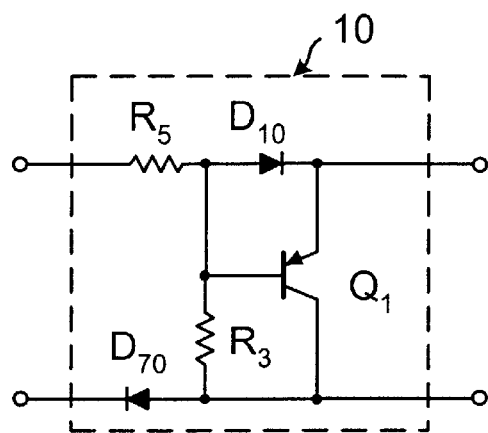
FIGS. 10A–10D are partial circuit diagram for possible realizations of the drivers for primary side switches using p-n-p bipolar transistors.
Figure 10B:
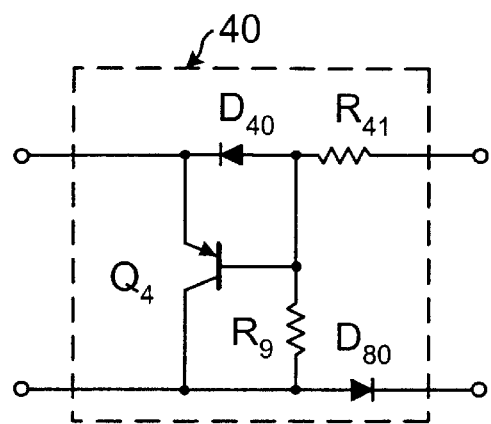
Figure 10C:
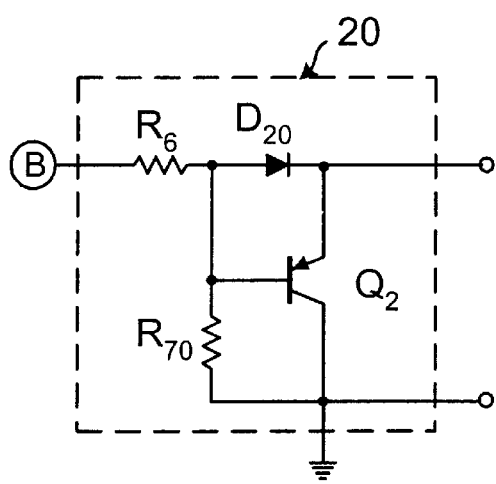
Figure 10D:
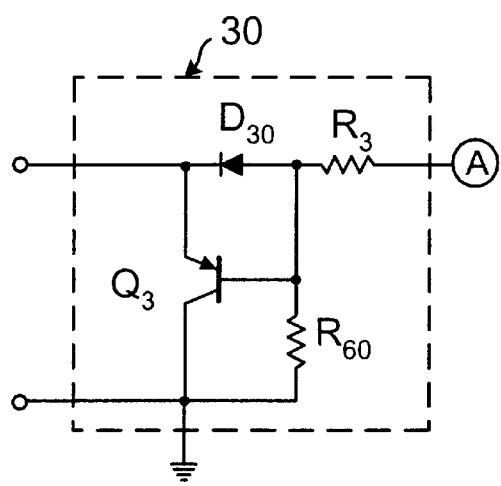

Even though transistors $Q_1$ through $Q_4$ are shown as p-channel MOSFETs, it is possible to use n-channel MOSFETs instead, as well as bipolar transistors. The former are more practical due to an easier drive and an integrated body diode, which would be needed as an external component if $Q_1$ through $Q_4$ were bipolar transistors. One possible realization using n-channel MOSFETs as $Q_1$ and $Q_4$ for example from FIGS. 1A, 1C and 5A is shown in FIGS. 9A and 9B. When p-n-p bipolar transistors are used for $Q_1$ and $Q_4$, two additional diodes, $D_{70}$ and $D_{80}$, respectively, are used as shown in FIGS. 10A and 10B. Diodes $D_{70}$ and $D_{80}$ prevent windings $N_1$ and $N_2$ from shorting via the collector-emitter junction of $Q_1$ and $Q_4$, respectively. One possible realization using p-n-p transistors for $Q_2$ and $Q_3$ is shown in FIGS. 10C and 10D. Since diodes $D_{50}$ and $D_{60}$ already exist (FIGS. 1A and 5A), extra diodes are not needed as was the case in FIGS. 10A and 10B.

If the control circuit is referenced to the input side of the converter, as is controller 102 in FIG. 1A, there must be means to disable the converter from a condition sensed on the output side, for example, in case of output over-voltage, under-voltage or over-current conditions. Similarly, if the feedback and control circuit is referenced to the output of the converter, as is controller 104 in FIG. 5B, there must be means to disable the converter from the input side of converter, for example, in case of input over-voltage, under-voltage conditions or in order to turn the converter off. A previous solution which has been employed uses an opto-coupler. This solution has several disadvantages:

Opto-couplers cannot operate at temperatures above 85° C. (some are limited to 100° C.), and therefore will impose serious temperature limitations of the printed circuit board (PCB) which is also used as a means for cooling semiconductor devices and magnetic devices;

Unless it is fast (digital), the opto-coupler will not provide a fast enough disable of the control circuit, particularly in the case of output over-voltage condition when the controller is on the input side and the converter operates at high switching frequency;

Opto-couplers are not available in small, low profile packages. Thus, it will be the tallest component and will impose a limit on the low-profile design of the converter.

Another prior art solution has been to have a separate pulse transformer that will be used only for this function. The main drawbacks of this alternative are:

An additional component which needs to meet all safety requirements;

Extra space is required on the PCB, thus imposing limits on the minimum size of the PCB;

If there is no other use of this transformer it is not a practical solution.

Figure 11A:
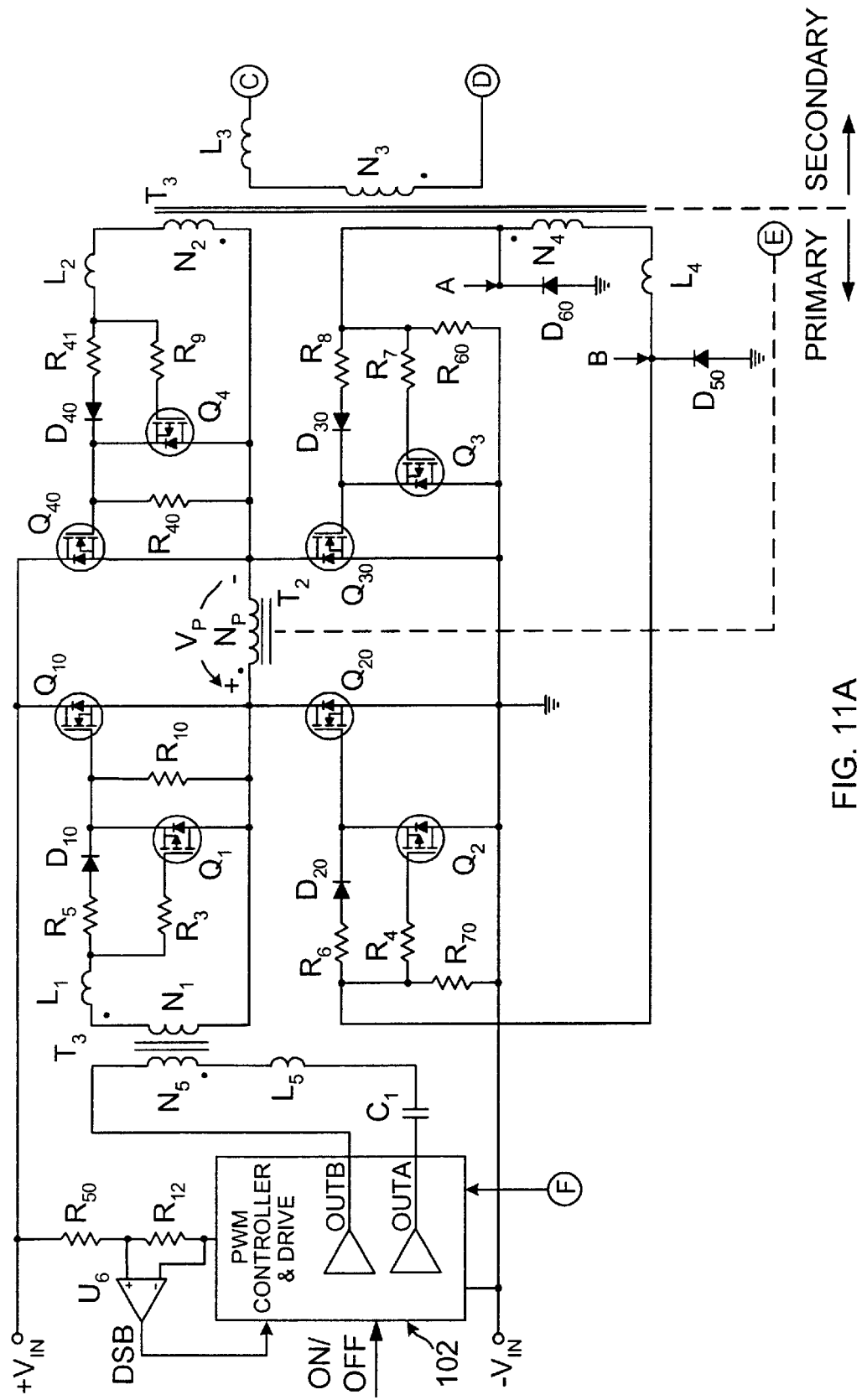
FIGS. 11A and 11B comprise an alternative circuit embodiment to facilitate disabling the control circuit, referenced to the input side, from a condition sensed on the output side of the converter.
Figure 11B:
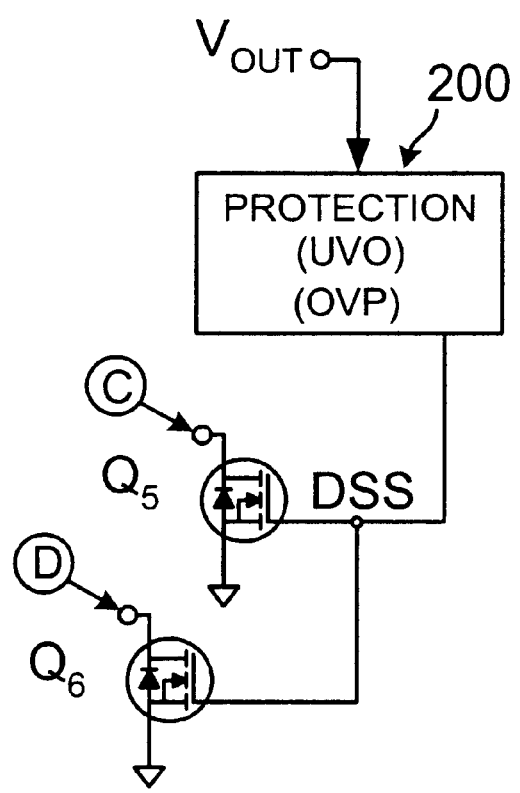

An alternate solution disclosed herein provides, as shown in FIGS. 11A and 11B, means for disabling the control circuit on the input side from a condition sensed on the output side of the converter, as described in detail below. The principle idea is to short winding $N_3$ of drive transformer $T_3$, detect excessive current in winding $N_5$ due to shorted winding $N_3$, and disable the control circuit and drivers OUTA and OUTB (controller 102 in FIG. 11A), thus resulting in turn-off the converter. Different circuit realizations are possible as is known to one of ordinary skill in the art. Protection logic 200 (FIG. 11B), referenced to the output of the converter, generates signal DSS whenever the converter needs to be disabled (for example, in case of over-voltage on the output, under-voltage, over-current or any other non regular operating condition). Active signal DSS turns-on switches $Q_5$ and $Q_6$ (shown as a possible realization with n-channel MOSFETs in FIG. 11B), which in turn shorts winding $N_3$ of drive transformer $T_3$. Current in winding $N_5$ is indirectly measured with resistor $R_{12}$ that is connected to the positive rail of the supply voltage of controller 102 and measures the total current into controller 102. Note that resistor $R_{12}$ could be placed in different locations such as in series with winding $N_3$, for example. The voltage across resistor $R_{12}$ is sensed with comparator $U_6$ that has a threshold set such that in normal operation the voltage drop across resistor $R_{12}$ will not trip $U_6$, but when winding $N_3$ is shorted, comparator $U_6$ is tripped, and generates signal DSB which disables controller 102 and both OUTA and OUTB are disabled (that is, they are in the low state).

An alternate embodiment disclosed herein provides, as shown in FIGS. 5A through D, a means for disabling the control circuit referenced to the output side of the converter from a condition sensed on the input side of converter as described in detail below. Protection logic 201 on the input side of the converter, shown in FIGS. 5C and 5D, initially senses a fault condition on the input side and generates a disable signal DSP that is active (high). Switch $Q_{100}$, shown as an n-channel MOSFET as one possible practical realization in FIG. 5C, is connected to one end (either at point "A" or "B") of winding $N_4$ (FIG. 5A). In response to an active disable signal DSP, transistor $Q_{100}$ is turned-on and winding $N_4$ is shorted via $Q_{100}$ and diode $D_{60}$, if $Q_{100}$ is connected to end "A" of $N_4$. Similarly, winding $N_4$ is shorted via transistor $Q_{100}$ and diode $D_{50}$ if $Q_{100}$ is connected to end "B" of $N_4$. By shorting winding $N_4$, two primary side switches (specifically $Q_{20}$ and $Q_{30}$), that were on before the DSP signal became active, are turned-off. In addition, increased current in winding $N_3$ is sensed with resistor $R_{11}$ connected between supply voltage $V_{CCS}$ and drivers DRIVER_A and DRIVER_B referenced to the output of the converter. DRIVER_A and DRIVER_B are shown in FIG. 5B explicitly with a possible realization as complementary pairs of p- and n-channel MOSFETs. The voltage across resistor $R_{11}$ is sensed with comparator $U_5$ that has a threshold set such that in normal operation the voltage drop across resistor $R_{11}$ will not trip $U_5$, but when winding $N_4$ is shorted, comparator $U_5$ is activated, causing controller 104 to disable OUTA and OUTB, and consequently the converter. Note that switch $Q_{100}$ can be connected in parallel with either primary switch $Q_{20}$ or $Q_{30}$ in which case the gate of transistor $Q_{20}$ or $Q_{30}$ will be shorted in response to the active disable signal. As a consequence, winding $N_4$ will be shorted via transistor $Q_{100}$ and diodes $D_{20}$ and $D_{60}$ or diodes $D_{30}$ and $D_{50}$, causing again increased current through windings $N_4$ and $N_3$. A possible drawback of this solution is that the capacitance of transistor $Q_{100}$ may affect the turn-on performance of primary switches $Q_{20}$ or $Q_{30}$. In order for $Q_{20}$ or $Q_{30}$ to have similar turn-on characteristics with $Q_{40}$ and $Q_{10}$, respectively, leakage inductance $L_4$ is needed to be less then $L_1$ or $L_2$, thus resulting in a more complicated drive transformer design. Note that the disable circuit from FIG. 5C has an inherent delay of one switching period since winding $N_4$ is shorted only during the on-time of either transistors $Q_{10}$ and $Q_{30}$ or transistors $Q_{20}$ and $Q_{40}$. In most applications this should not be a problem.

Figure 5D:
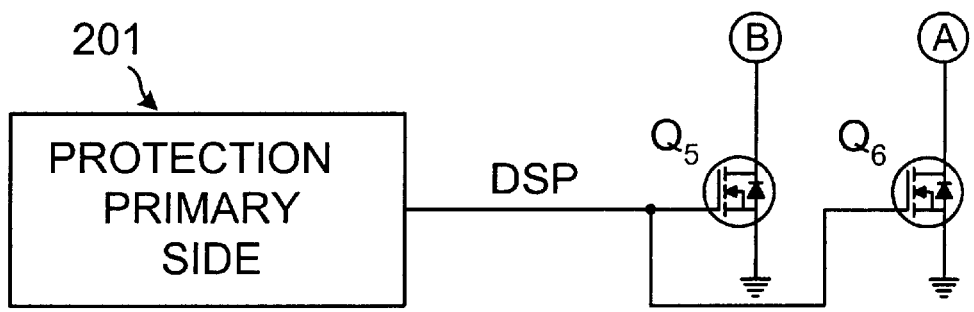
FIG. 5D is another alternative circuit embodiment similar to FIG. 5C.

As an additional embodiment, two switches shown as n-channel MOSFETs $Q_5$ and $Q_6$ in FIG. 5D are used to short winding $N_4$ when the DSP signal is high in order to stop controller 104 and disable OUTA and OUTB, immediately, whenever a fault condition on the input side of converter is detected. The body diodes of $Q_5$ and $Q_6$ can replace diodes $D_{50}$ and $D_{60}$, respectively, thus further simplifying the circuit. In addition, this circuit provides an inherent delay of one half of the switching period.

In the invention, winding $N_4$ has the best coupling with winding $N_3$, while windings $N_2$ and $N_1$ are placed in layers above and below in the PCB. This is the preferred structure because it provides enough leakage between $N_3$ and $N_1$ and $N_2$, and also decouples $N_1$ and $N_2$ from $N_3$ when $N_4$ is shorted. Other arrangements of windings in the drive transformer of the invention are also possible.

It should be understood that the foregoing embodiments are exemplary for the purpose of teaching the inventive aspects of the present invention that are covered solely by the appended claims and encompass all variations not regarded as a departure from the scope of the invention. It is likely that modifications and improvements will occur to those of ordinary skill in the art and they are intended to be included within the scope of the following claims and their equivalents.

What is claimed is:

1. A switch-mode power converter for converting an input voltage from an input source to an output voltage for supply to a load, the power converter comprising:

a power isolation transformer having a primary winding and split first and second secondary windings;

a primary converter circuit employing full bridge topography comprising a first, and a second primary controllable power switch forming one leg of said full-bridge and a third and a fourth primary controllable power switch forming a second leg of said full-bridge, said first and said fourth primary controllable power switch being connected to the positive side of the input voltage and said second and said third primary controllable power switch being connected to negative side of input voltage, each said leg of said full bridge being connected to said primary winding of said power transformer for alternatively supplying the input voltage to said primary winding of said power isolation transformer to produce a substantially symmetrical current in said primary winding;

a full wave secondary converter circuit fully isolated from said primary converter circuit and comprising first and a second synchronous rectifiers, said synchronous rectifiers being individually switchable and each being connected between a respective one of said first and second secondary windings and the load;

a first, a second, a third and a fourth primary switch control circuit controlling the conduction of said first, second, third and fourth primary controllable power switches;

a synchronous rectifier control circuit controlling conduction of said each first and second synchronous rectifiers;

a switch conduction control circuit with two outputs having substantially symmetrical waveforms shifted by about 180 degrees for controlling the conduction of said primary controllable power switches and said first and second synchronous rectifiers; and a drive transformer used for providing necessary delays between conductions of said primary controllable power switches and said first and second synchronous rectifiers as well as providing power for controlling said primary controllable power switches and said first and second synchronous rectifiers, said drive transformer providing isolation between said primary switch control circuits and said synchronous rectifier control circuits, and said drive transformer comprising:

a first drive transformer winding connected to said switch conduction control circuit;

a second drive transformer winding connected to said first primary switch control circuit, said second drive transformer winding controlling the conduction of said first primary controllable power switch; and a third drive transformer winding connected to said fourth primary switch control circuit, said third drive transformer winding controlling the conduction of said fourth primary controllable power switch.

2. The power converter recited in claim 1, and further comprising a fourth drive transformer winding connected to said synchronous rectifier control circuit, said fourth drive transformer winding controlling the conduction of said synchronous rectifier.

3. The power converter recited in claim 2, further comprising a fifth drive transformer winding connected to said second and said third primary switch control circuits, said fifth drive transformer winding having a leakage inductance carefully selected and designed in order to achieve optimum delay in turning-on said second and said third primary controllable power switch, said inductances associated with said fifth drive transformer selected to match the leakage inductances of said second and said third drive transformer windings.

4. The power converter recited in claim 2, wherein said second and said third drive transformer windings further comprise leakage inductances associated with said drive transformer windings, said leakage inductances being carefully selected and designed in order to achieve optimum delay in turning-on said first and said fourth primary controllable power switches.

5. The power converter recited in claim 2, wherein each said synchronous rectifier control circuit further comprises:

at least one two input logic circuit to control conduction of each said synchronous rectifier with relatively small input capacitance so that the leakage inductance of said fourth transformer winding does not adversely affect the delay in turning off said synchronous rectifier, wherein one input of said two input logic circuit is connected to one end of said drive transformer winding connected to said synchronous rectifier control circuit, and the second input of said two input logic circuit is connected to the corresponding synchronous rectifier in order to prevent turning-on of said synchronous rectifier before voltage across said synchronous rectifier drops to a predetermined value; and a driver circuit connected to said each synchronous rectifier providing optimum turn-on of said synchronous rectifier and providing optimum turn-off of said synchronous rectifier with minimum delay.

6. The power converter recited in claim 5, wherein said two input logic circuit comprises protective diodes on each of said two inputs in order to selectively provide negative and positive voltage greater than supply voltage to be applied across each said input of said two input logic circuit.

7. The power converter recited in claim 6, wherein said two input logic circuit has series resistors in each of said two inputs in order to limit current in said protective diodes whenever negative or positive voltage greater than supply voltage is applied across each said input of said two input logic circuit.

8. The power converter recited in claim 2, wherein said switch conduction control circuit is referenced to said output of said power isolation transformer.

9. The power converter recited in claim 8, further comprising means to disable the switch-mode power converter from the output side of said switch-mode power converter in response to a condition sensed on the input side of said switch-mode power converter.

10. The power converter recited in claim 1, wherein said switch conduction control circuit is also connected to one end of said input voltage.

11. The power converter recited in claim 10, further comprising means for disabling the power converter on the input side and thus also the output side from a condition sensed on the output side.

12. The power converter recited in claim 10, and further comprising means for enabling the power converter on the input side from a condition sensed on the output side.

13. The power converter recited in claim 1, wherein said second and said third primary switch controls are connected to said switch conduction control circuit through a first and a second inductor, said first and said second inductors being selected to have inductances close to said leakage inductances associated with said second and said third drive transformer windings.

14. The power converter recited in claim 1, wherein said each primary switch control circuit further comprises:
   at least one controllable switch connected across the control terminals of said primary controllable power switch, said controllable switch being configured to effectively control and provide turn-off of said primary controllable power switch sufficiently quickly to prevent cross conduction of said primary controllable power switches in case of near equal conduction times; and
   a diode configured to control and provide turn-on of said primary controllable power switch and to control and provide turn-on of said controllable switch.

15. The power converter recited in claim 14, wherein said at least one controllable switch is physically located close to said first and second primary controllable power switches to enhance turn-off of said primary controllable power switches.

16. A switch-mode power converter for converting an input voltage from an input source to an output voltage for supply to a load, the power converter comprising:
   a power isolation transformer having a primary winding and a second secondary winding;
   a primary converter circuit employing full bridge topography comprising a first, and a second primary controllable power switch forming one leg of said full-bridge and a third and a fourth primary controllable power switch forming a second leg of said full-bridge, said first and said fourth primary controllable power switch being connected to the positive side of the input voltage and said second and said third primary controllable power switch being connected to negative side of input voltage, each said leg of said full bridge being connected to said primary winding of said power transformer for alternatively supplying the input voltage to said primary winding of said power isolation transformer to produce a substantially symmetrical current in said primary winding;
   a full wave secondary converter circuit fully isolated from said primary converter circuit and comprising first and a second synchronous rectifiers, said synchronous rectifiers being individually switchable and each being connected between a respective end of said first and second secondary windings and the load;
   a first, a second, a third and a fourth primary switch control circuit controlling the conduction of said first, second, third and fourth primary controllable power switches;
   a synchronous rectifier control circuit controlling conduction of said each first and second synchronous rectifiers;
   a switch conduction control circuit with two outputs having substantially symmetrical waveforms shifted by about 180 degrees for controlling the conduction of said primary controllable power switches and said first and second synchronous rectifiers; and
   a drive transformer used for providing necessary delays between conductions of said primary controllable power switches and said first and second synchronous rectifiers as well as providing power for controlling said primary controllable power switches and said first and second synchronous rectifiers, said drive transformer providing isolation between said primary switch control circuits and said synchronous rectifier control circuits, and said drive transformer comprising:
      a first drive transformer winding connected to said switch conduction control circuit;
      a second drive transformer winding connected to said first primary switch control circuit, said second drive transformer winding controlling the conduction of said first primary controllable power switch; and
      a third drive transformer winding connected to said fourth primary switch control circuit, said third drive transformer winding controlling the conduction of said fourth primary controllable power switch.

17. The power converter recited in claim 16, and further comprising a fourth drive transformer winding connected to said synchronous rectifier control circuits, said fourth drive transformer winding controlling the conduction of said synchronous rectifier.

18. The power converter recited in claim 17, further comprising a fifth drive transformer winding connected to said second and said third primary switch control circuits, said fifth drive transformer winding having a leakage inductance carefully selected and designed in order to achieve optimum delay in turning-on said second and said third primary controllable power switch, said inductance associated with said fifth drive transformer winding selected to match the leakage inductances of said second and said third drive transformer windings.

19. The power converter recited in claim 17, wherein each said synchronous rectifier control circuit further comprises:
   at least one two input logic circuit to control conduction of each said synchronous rectifier with relatively small input capacitance so that the leakage inductance of said fourth transformer winding does not adversely affect the delay in turning off said synchronous rectifier, wherein one input of said two input logic circuit is connected to one end of said drive transformer winding connected to said synchronous rectifier control circuit, and the second input of said two input logic circuit is connected to the corresponding synchronous rectifier in order to prevent turning-on of said synchronous rectifier before voltage across said synchronous rectifier drops to a predetermined value; and
   a driver circuit connected to each said synchronous rectifier providing optimum turn-on of said synchronous rectifier and providing optimum turn-off of said synchronous rectifier with minimum delay.

20. The power converter recited in claim 19, wherein said two input logic circuit comprises protective diodes on each of said two inputs in order to selectively provide negative and positive voltage greater than supply voltage to be applied across each said input of said two input logic circuit.

21. The power converter recited in claim 20, wherein said two input logic circuit has series resistors in each of said two inputs in order to limit current in said protective diodes whenever negative or positive voltage greater than supply voltage is applied across each said input of said two input logic circuit.

22. The power converter recited in claim 17, wherein said switch conduction control circuit is referenced to said output of said power isolation transformer.

23. The power converter recited in claim 22, further comprising means to disable the switch-mode power converter from the output side of said switch-mode power converter in response to a condition sensed on the input side of said switch-mode power converter.

24. The power converter recited in claim 16, wherein said switch conduction control circuit is also connected to one end of said input voltage.

25. The power converter recited in claim 24, wherein said second and said third drive transformer windings further comprise leakage inductances associated with said drive transformer windings, said leakage inductances being carefully selected and designed in order to achieve optimum delay in turning-on said first and said fourth primary controllable power switches.

26. The power converter recited in claim 24, further comprising means for disabling the power converter on the input side and thus also the output side from a condition sensed on the output side.

27. The power converter recited in claim 21, and further comprising means for enabling the power converter on the input side from a condition sensed on the output side.

28. The power converter recited in claim 16, wherein said second and said third primary switch controls are connected to said switch conduction control circuit through a first and a second inductor, said first and said second inductors being selected to have inductances close to said leakage inductances associated with said second and said third drive transformer windings.

29. The power converter recited in claim 16, wherein said each primary switch control circuit further comprises:
  at least one controllable switch connected across the control terminals of said primary controllable power switch, said controllable switch being configured to effectively control and provide turn-off of said primary controllable power switch sufficiently quickly to prevent cross conduction of said primary controllable power switches in case of near equal conduction times; and
  a diode configured to control and provide turn-on of said primary controllable power switch and to control and provide turn-on of said controllable switch.

30. The power converter recited in claim 29, wherein said at least one controllable switch is physically located close to said first and second primary controllable power switches to enhance turn-off of said primary controllable power switches.

31. A method of converting an input voltage from an input power source to an output voltage to supply to a load employing a circuit having a power isolation transformer having a primary winding, a drive transformer, primary controllable power switches, synchronous rectifiers, and controllable switches, the method comprising the steps of:
  converting power from one form to another form using the power isolation transformer;
  isolating the input power from the output voltage;
  alternating the conduction of the primary controllable power switches for alternatively supplying the input voltage to said primary winding of said power isolation transformer to transfer energy from the input to the output;
  alternating the conduction of synchronous rectifiers to rectify and provide dc output voltage;
  supplying power to said primary controllable power switches and said synchronous rectifiers;
  cycling said primary controllable switches on and off;
  delaying the turn-on of said primary controllable power switches using the leakage inductances associated with the windings of said drive transformer and the input capacitance of the primary controllable power switches;
  delaying the turn-on of said synchronous rectifiers until sensed voltage across said synchronous rectifiers drops to a predetermined value;
  ensuring minimum delay in turn-off of said primary controllable power switches so that the switching delay of said controllable switch is not affected by the leakage inductance of associated drive transformer winding, thereby allowing fast turn-off of said primary controllable power switch connected to a drive transformer winding; and
  ensuring minimum delay in turn-off of said synchronous rectifiers so that the switching delays are not affected by the leakage inductance of the associated drive transformer winding connected to said synchronous rectifier control circuits.

32. The method recited in claim 31, and further comprising the step of powering and controlling said drive transformer and associated circuits using a switch conduction control circuit.

* * * * *